PULSE CODE MODULATION COMMUNICATION SYSTEM
Filed May 10, 1945 13 Sheets-Sheet 1

INVENTORS H. S. BLACK
J. O. EDSON
BY William F. Simpson.
ATTORNEY

INVENTORS H. S. BLACK
J. O. EDSON
BY William F. Simpson.
ATTORNEY

Feb. 6, 1962 H. S. BLACK ET AL 3,020,350

PULSE CODE MODULATION COMMUNICATION SYSTEM

Filed May 10, 1945 13 Sheets-Sheet 3

INVENTORS H. S. BLACK
J. O. EDSON
BY William F. Simpson
ATTORNEY

Feb. 6, 1962 H. S. BLACK ET AL 3,020,350
PULSE CODE MODULATION COMMUNICATION SYSTEM
Filed May 10, 1945 13 Sheets-Sheet 4

INVENTORS H. S. BLACK
J. O. EDSON
BY William F. Simpson
ATTORNEY

PULSE CODE MODULATION COMMUNICATION SYSTEM

Filed May 10, 1945

13 Sheets-Sheet 5

INVENTORS H. S. BLACK
J. O. EDSON
BY William F. Simpson
ATTORNEY

INVENTORS H. S. BLACK
J. O. EDSON
BY William F. Simpson.
ATTORNEY

PULSE CODE MODULATION COMMUNICATION SYSTEM

Filed May 10, 1945 13 Sheets-Sheet 7

INVENTORS H. S. BLACK
J. O. EDSON
BY William F. Simpson
ATTORNEY

INVENTORS H. S. BLACK
J. O. EDSON
BY William F. Simpson.
ATTORNEY

INVENTORS H. S. BLACK
J. O. EDSON
BY William F. Simpson
ATTORNEY

Feb. 6, 1962 H. S. BLACK ET AL 3,020,350

PULSE CODE MODULATION COMMUNICATION SYSTEM

Filed May 10, 1945

13 Sheets-Sheet 10

INVENTORS H. S. BLACK
J. O. EDSON
BY William F. Simpson.
ATTORNEY

INVENTORS H. S. BLACK
J. O. EDSON
BY William F. Simpson.
ATTORNEY

PULSE CODE MODULATION COMMUNICATION SYSTEM

Filed May 10, 1945 13 Sheets-Sheet 12

INVENTORS H. S. BLACK
J. O. EDSON
BY William F. Simpson
ATTORNEY

INVENTORS H. S. BLACK
J. O. EDSON
BY William F. Simpson
ATTORNEY

United States Patent Office 3,020,350

Patented Feb. 6, 1962

3,020,350
PULSE CODE MODULATION COMMUNICATION SYSTEM

Harold S. Black, Elmhurst, and James Oliver Edson, Great Kills, N.Y., assignors to Bell Telephone Laboratories, Incorporated, New York, N.Y., a corporation of New York Filed May 10, 1945, Ser. No. 592,967
31 Claims. (Cl. 179—15)

Figure 3:
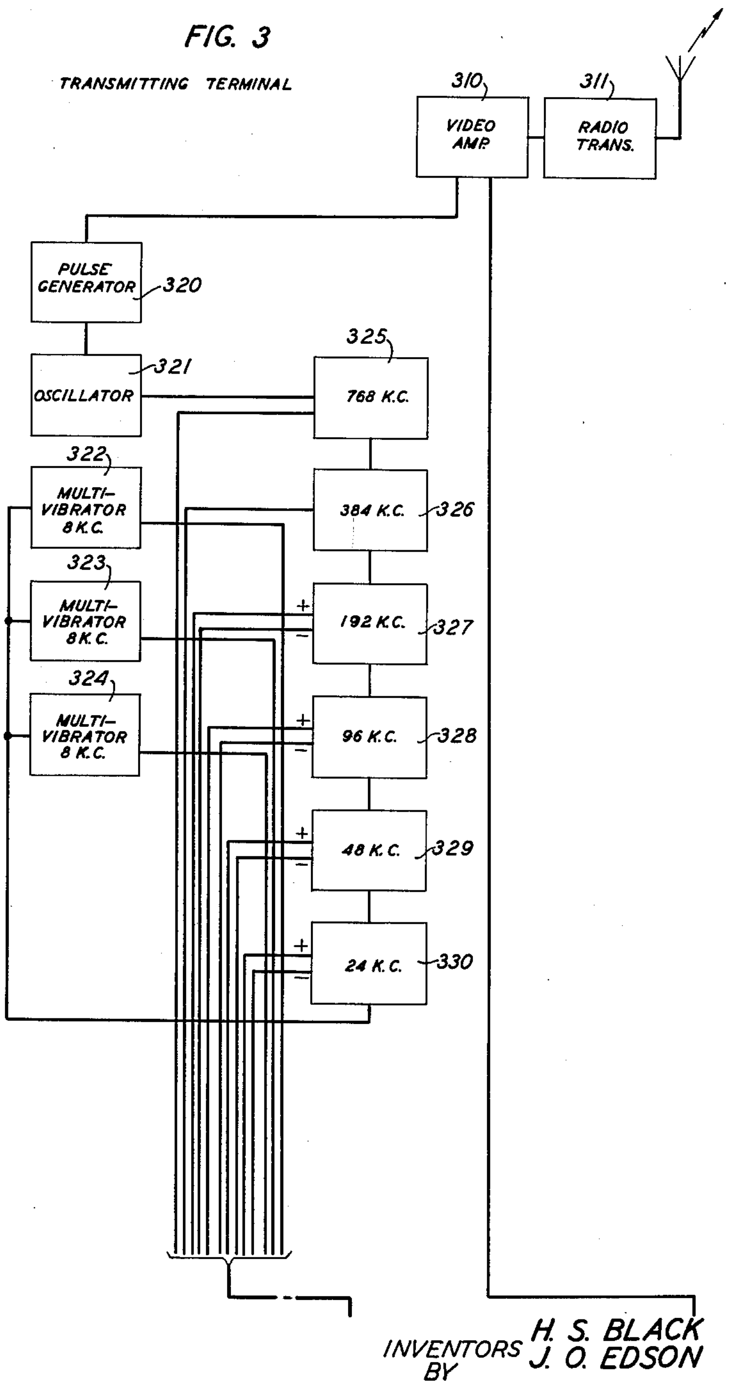

This invention relates to a communication system and more particularly to a communication system in which the intelligence is transmitted by means of permutation code pulses.

Pulse transmission systems usually transmit two or more different signaling conditions which are frequently called different types of pulses, as for example, current or no-current pulses, or pulses of two or more different magnitudes or kinds of currents. Such pulse systems can transmit the maximum of information over a channel having a given frequency band width in a given time, or require a minimum band width to convey a given amount of information in a given time, when the pulses are arranged in groups in which each group comprises a specified number of pulses and in which the pulses in each group are arranged in permutations representing the information. In addition to providing the most economical use of line time, systems employing permutation codes retain the advantages of pulse systems such as freedom from distortion, advantageous signal-to-noise ratio, etc.

An object of the present invention is to provide methods of and apparatus and circuits for receiving information represented by pulses or a pulse code system of one type and automatically representing the same intelligence or information by pulses of a different type of code or transmission system.

In accordance with an examplary embodiment of the present invention, pulses are received from a system in which the information is conveyed or represented by the time position or lapse of time between a reference time and the time each of the individual pulses is received. This information is then automatically represented by a permutation code series of pulses of a uniform number in which the pulses of each position are represented by either one or the other of two different signaling conditions. Pulse code systems of this type are sometimes called a permutation code or a binary code and at other times, when a particular code is applied, a binary number code.

Another object of the present invention is to receive permutation code pulses representing intelligence and automatically generate therefrom a single pulse, the time of which, relative to a reference time, conveys or represents the same intelligence or information.

Another object of this invention relates to methods of and apparatus for generating a permutation series or code group of signalling conditions at a rapidly recurring rate in which the signalling conditions of each code group or series are simultaneously determined and then transmitted one after another.

In accordance with a feature of the present invention pulses from a number of channels are interspersed in any suitable manner which, in the examplary embodiment described herein, are in a random manner such that they are unintelligible unless received and recombined in the same random manner.

Another feature of the present invention relates to methods of and equipment for using a series of square wave generators of different frequencies, first for translating the pulses of one system to the pulses of another system and second, for interspersing the pulses from one channel and the pulses from another channel in a random manner which manner is easily changed from time to time.

The foregoing objects and features as well as other objects and features of the present invention may be more readily understood from the following description of an exemplary embodiment thereof when read with reference to the attached drawings. The following description of an exemplary embodiment of the invention is not intended to in any way increase or limit the scope of the claims appended hereto which specifically set forth the novel features of the present invention and the manner of cooperation of the various elements thereof.

Figure 1:
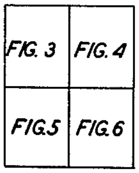
Figure 2:
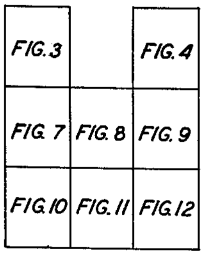
Figure 13:
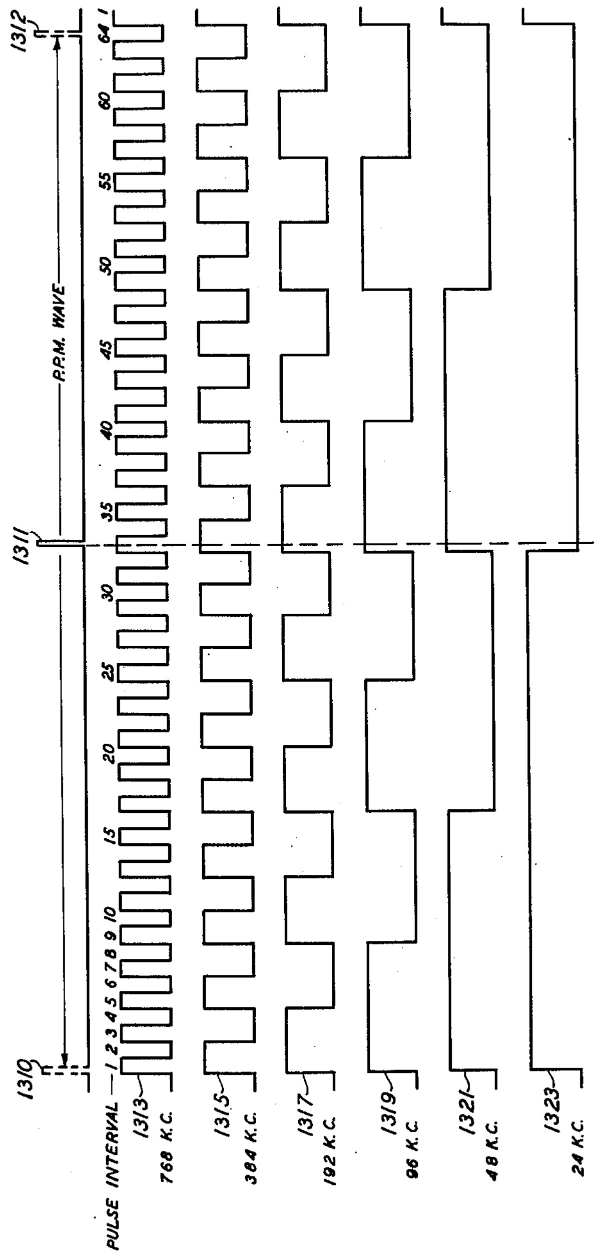
Figure 14:
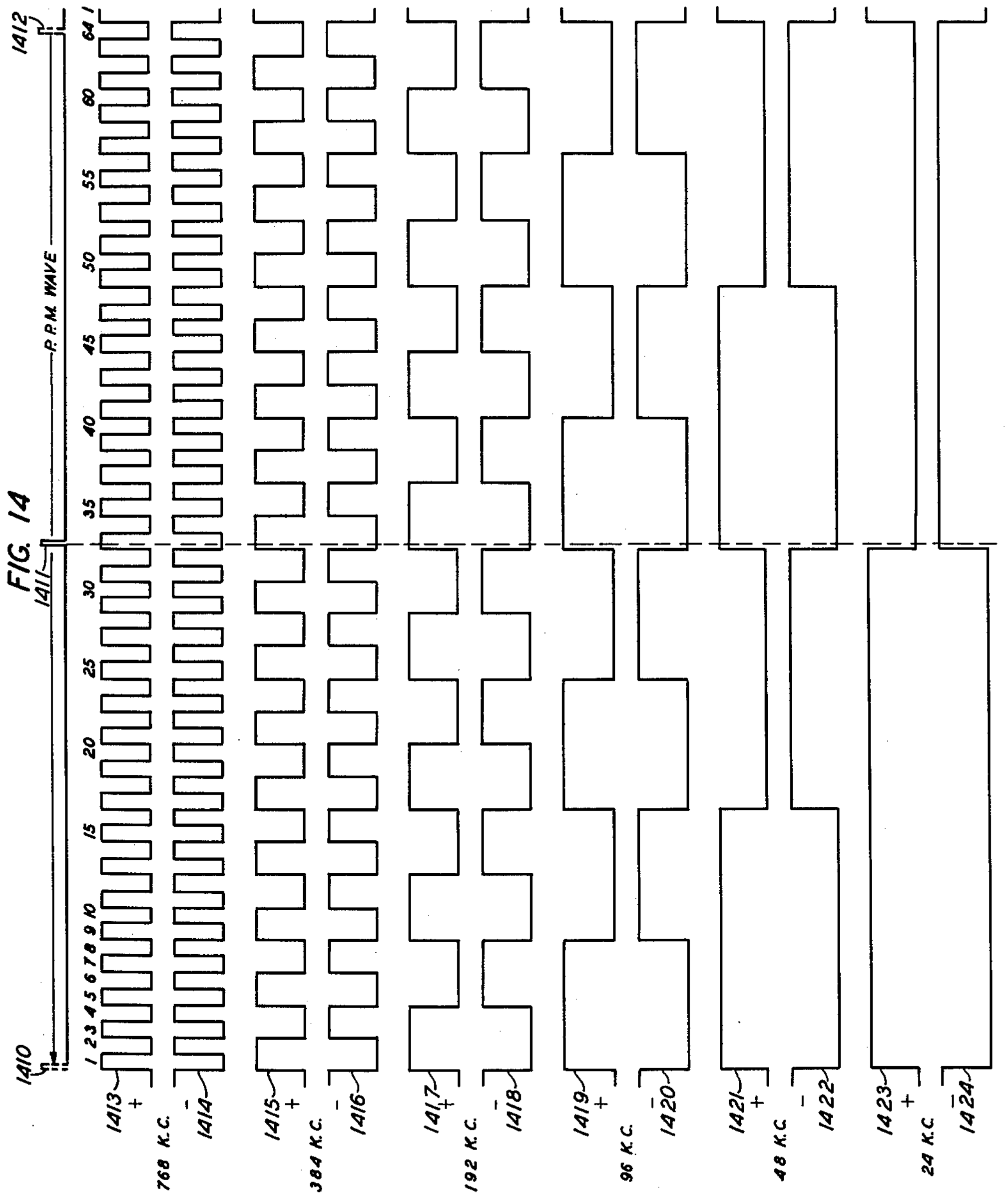
Figure 15:
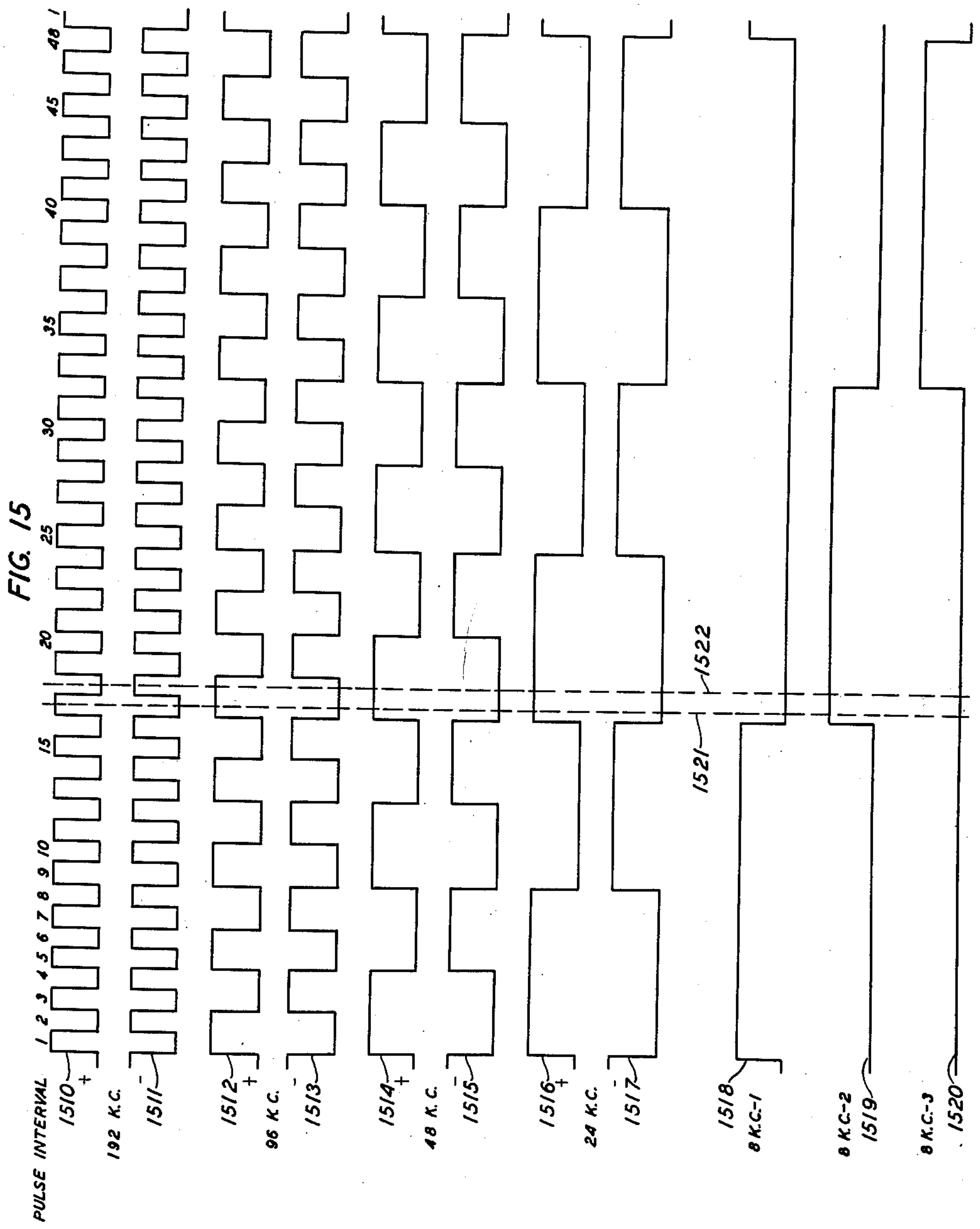

FIG. 1 of the drawing shows the manner in which FIGS. 3, 4, 5 and 6 are positioned adjacent one another;

FIGS. 3, 4, 5 and 6 when positioned adjacent one another as shown in FIG. 1 show in outline form the various elements of an exemplary system embodying the present invention and the manner in which these elements cooperate one with another;

FIG. 2 shows the manner in which FIGS. 3, 4, 7, 8, 9, 10, 11 and 12 are arranged adjacent one another;

FIGS. 3, 4, 7, 8, 9, 10, 11 and 12 when positioned as shown in FIG. 2 show in detail the circuits and apparatus of several channels of an exemplary system embodying the present invention; and FIGS. 13, 14 and 15 show the wave form of certain currents or voltages obtained from various circuits and illustrate the operation of the various circuits and the cooperation between them.

Figure 4:
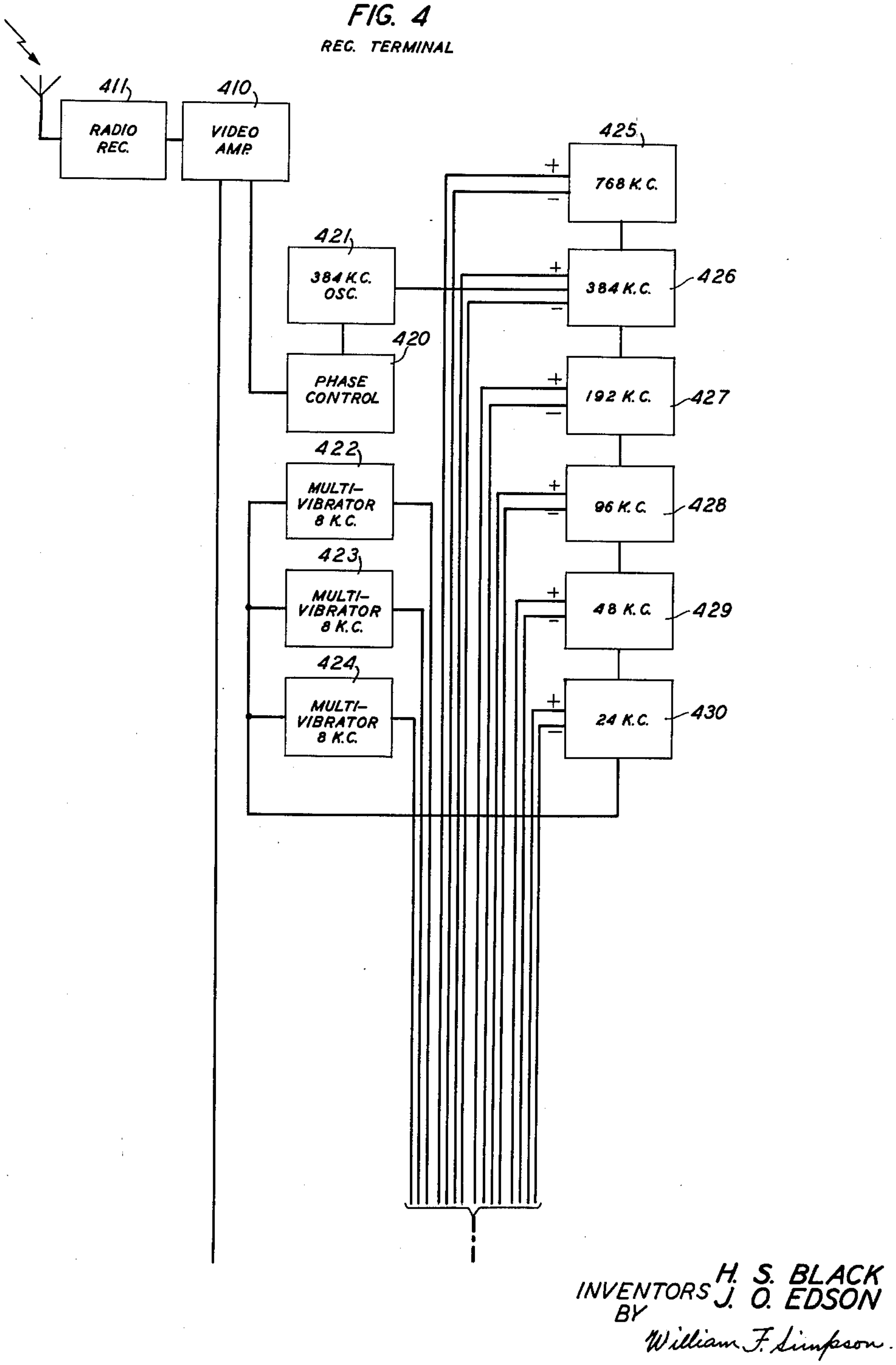
Figure 5:
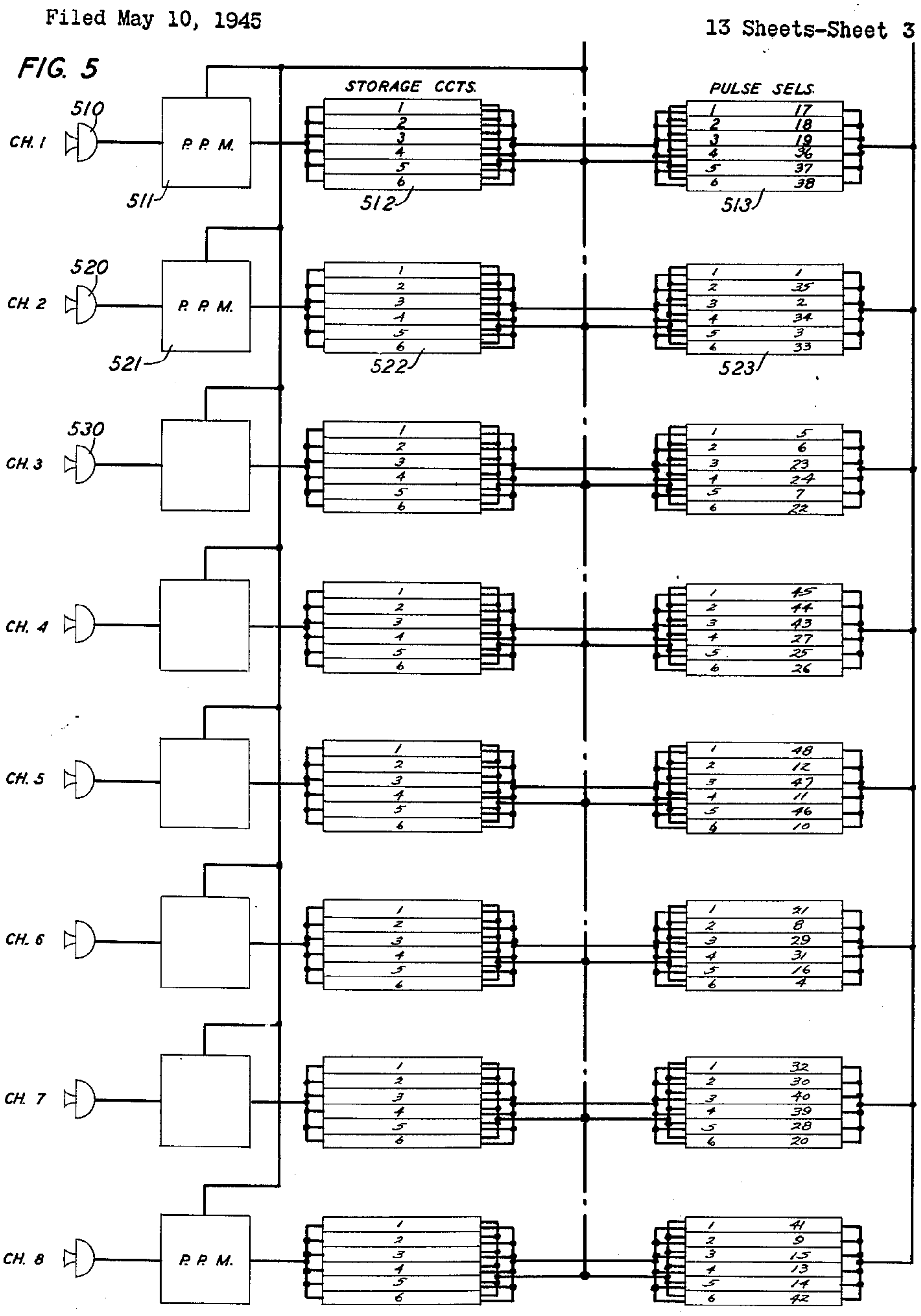
Figure 6:
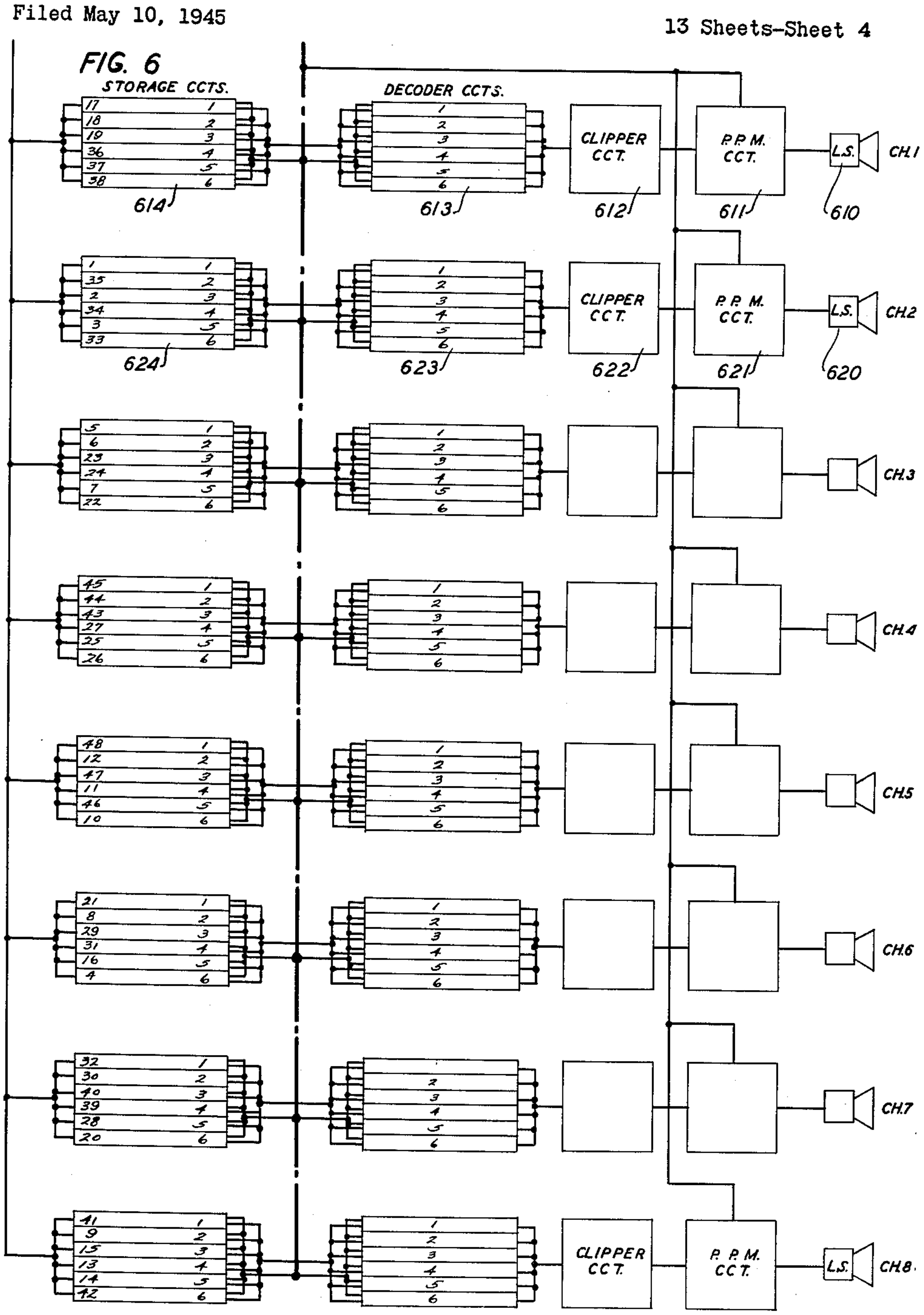

Referring now to FIGS. 3, 4, 5 and 6, when arranged as shown in FIG. 1, FIG. 3 shows in schematic form various circuit elements common to a group of channels at the transmitting end of the system; FIG. 4 shows similar common equipment at the receiving end of the system; FIG. 5 shows transmitting equipment individual to each of the eight channels of the exemplary embodiment described herein; and FIG. 6 shows the similar equipment at the receiving end.

As shown in FIGS. 3, 4, 5 and 6 the details of an eight-channel system designed for the transmission of speech waves are disclosed which is capable of transmitting in only one direction, namely, from FIGS. 3 and 5 to FIGS. 4 and 6. It will be at once apparent to persons skilled in the art that these figures illustrate only half of the equipment which would be necessary to provide a two-way communication between the two ends of the system. A person skilled in the art will further understand and appreciate that it is only necessary to duplicate this equipment to provide communication paths operative in the opposite direction in order to provide a two-way communication or speech system.

A person skilled in the art will also readily understand that the common equipment shown in FIGS. 3 and 4 may be also common to the equipment similar to equipment shown in FIGS. 5 and 6 for the transmission of signals in the reverse direction except that additional equipment similar to the video amplifiers 310 and 410 and the radio equipment 311 and 411 will usually be provided for transmission in the reverse direction.

Referring now more specifically to FIG. 3, oscillator 321 represents the controlling oscillator at the transmitting station. It may be of any suitable type, preferably having a high degree of stability in so far as its output frequency is concerned. Typical oscillators having a high degree of stability and suitable for use as oscillator 321 are described in detail in the following patents: 1,788,533, Marrison, January 13, 1931; 1,931,873, Marrison, October 24, 1933; 2,087,326, Marrison, July 20, 1937; 2,163,403, Meacham, June 20, 1939; and 2,275,452, Meacham, March 10, 1942.

The disclosure of each of the foregoing patents is hereby made part of this present description to the same extent as if fully included herein.

The output of oscillator 321 is employed to control a group of square wave generators or "multivibrators" as they are sometimes called. In the exemplary embodiment described herein, multivibrator 325 has a fundamental output frequency of 768 kilocycles. The frequency of oscillator 321 may be any frequency suitable to control the multivibrator 325 at the above specified frequency. Oscillator 321 either directly or through the multivibrator 325 will control a second multivibrator 326 which has a fundamental output frequency of 384 kilocycles. Each of the succeeding multivibrators 327, 328, 329 and 330 are similarly controlled at the respective frequencies of 192 kilocycles, 96 kilocycles, 48 kilocycles and 24 kilocycles. Multivibrators 325 and 326 as shown in FIG. 3 have a single output. Multivibrators 327 to 330 each have two outputs, one of which is designated plus or positive and the other minus or negative in FIG. 3.

The positive outputs of the multivibrators 325 through 330 are shown in FIG. 13 by the broken lines or curves 1313 to 1323 inclusive. As shown in FIG. 13 the output wave forms are rectangular in shape and each horizontal portion of any one wave form is of equal length. In other words, the positive current output is of the same time duration as the time during which no current is present in the output lead. Such an output arrangement is desirable for the multivibrators 325 through 330 inclusive.

In addition, three multivibrators 322, 323 and 324 all operating at a fundamental frequency of 8 kilocycles are provided. Each of these multivibrators is arranged to have an output wave form of the type disclosed by broken lines 1518, 1519 and 1520 in FIG. 15. As shown in curve 1518, the output of the first multivibrator 322 comprises current for substantially one-third of each period and no current during the remaining two-thirds of the period. The output of the second multivibrator 323 similarly comprises current during one-third of the entire time and no current during the other two-thirds. However, the current output from each of these multivibrators is for different thirds of each cycle so that in any instant of time only one of the multivibrators is supplying an output current.

Typical multivibrator circuits suitable for use in the exemplary system described herein are described in greater detail in United States Patents 1,744,935, Van der Pol, January 28, 1930, and 2,022,696, Meacham, December 3, 1935, and in an article by Hull and Clapp published in the Proceedings of the Institute of Radio Engineers for February 1929, pages 252 to 271. See also section 4–9 entitled "Multivibrator" on page 182 of Ultra-High-Frequency Techniques by Brainerd, Koehler, Reich, and Woodruff. All the foregoing patents and publications are hereby made a part of this application as if fully included herein.

The outputs of the multivibrator circuits shown in FIG. 3 are connected to the translating and storage circuits and the pulse selecting circuits shown in FIG. 5.

As shown in FIG. 5, a source of signals is represented by a microphone 510 associated with channel 1. A similar source of signals is represented by a microphone 520 which is shown connected to channel 2. Other similar sources are shown connected to the other channels 3 through 8.

While the source of signals has been represented as a microphone in each case, it will be readily understood by persons skilled in the art that any suitable source of signals may be employed such as phonograph pick-ups, light sensitive pick-ups, vibration devices, picture transmission apparatus, telegraph and printing telegraph, etc. It will also be evident to a person skilled in the art that certain of the channels may be employed for the transmission from one type of device and other channels for the transmission from other types of devices.

As illustrated in FIG. 5, the source of signals 510 is connected to a pulse position modulation system 511. Similarly, the source of signals 520 is connected to another pulse position modulation system 521. The other sources are connected to similar pulse position modulation systems. The output of the pulse position modulation system 511 is connected to six storage circuits 512 which operate to translate the pulse position pulse into six pulses forming a permutation code. The permutation code is arranged so that the pulses represent a binary number in the exemplary embodiment described herein. It is to be understood, however, that any other suitable code arrangements may be employed.

A storage circuit 512 is provided for each of the pulses in each of the channels as illustrated in FIG. 5. These storage circuits are supplied with pulses from the multivibrator circuits as will be described hereinafter. The storage circuits are connected to the pulse selector and transmission circuits 513. As shown in FIG. 5, there are six pulse selector circuits for each channel, that is, one for each pulse where six pulses of a permutation code group are employed to represent the information of a single pulse of a pulse position modulation system. As illustrated in FIG. 5, the storage circuits for each channel are numbered 1 to 6. Similarly, the left-hand end of each of the pulse selecting circuits 513 are numbered 1 to 6. The right-hand ends of these circuits are numbered in accordance with the position of the respective pulse transmitted over the multiplex system.

As shown in the drawing, the outputs of all of these pulse selecting circuits are connected to a wide band video amplifier 310 which, in turn, is connected to a radio transmitter 311. Typical video amplifiers are described in greater detail in section 3–19 beginning on page 147 of Ultra-High-Frequency Techniques by Brainerd, Koehler, Reich and Woodruff, which is hereby made a part of this application as if fully included herein. The radio transmitter 311 transmits to the radio receiver 411 at the receiving station shown in FIG. 4. The output of the radio receiver 411 is connected to a wide band video amplifier 410. The output of this amplifier in turn is connected to a group of storage circuits 614 for channel 1, 624 for channel 2, etc. for the other channels. The output of each storage circuit 614 is connected to a decoding circuit 613, there being one decoding circuit and one storage circuit for each pulse transmitted for each of the channels. The output of the decoding circuits is amplified and clipped or limited by the amplifier circuit 612. The output current then passes into the receiving pulse position modulation circuit 611 and then to a suitable type of signal receiver 610.

The individual storage circuits and decoding circuits are numbered similarly to the manner in which the pulse selector circuits and storage circuits are numbered at the transmitting station. These circuits are connected to a similar group of multivibrator circuits 422 through 430 which circuits are in turn controlled by oscillator 421 and phase control equipment 420, in such a manner that the multivibrator circuits shown in FIG. 4 are maintained in synchronism with the received signals and thus substantially in synchronism with the multivibrator circuits at the transmission station shown in FIG. 3.

The receiving devices 610, 620, etc. may be of any suitable type, the receiving device including a loud speaker such as shown in FIG. 6. They may also include any suitable type of recording instrument for making a permanent record of the signal received including telegraph apparatus. The receiving devices connected to each of the channels will be suitable for receiving the type of signals transmitted by the respective transmitting device shown in FIG. 5. The pulse position modulation systems represented by 511 for channel 1 at the transmitting station and 611 for channel 1 at the receiving station may be of any suitable type of pulse position modulation system in which the time of the pulse related to a fixed reference time conveys all of the information. Such systems are frequently called pulse position modulation systems. The pulse position modulation system represented in the drawings of the exemplary embodiment of the present invention described herein operate in the usual manner. Consequently, a detailed description of their operation need not be set forth in detail herein. For more detailed description of systems of this type, reference is hereby made to the copending application of Edson, Serial No. 559,354, filed October 19, 1944; now Patent 2,682,575 of June 29, 1954; and to United States Patent 2,328,944, granted to W. A. Beatty on September 7, 1943, and more particularly when the sweep circuits employed in the system disclosed in that patent are of a type similar to the type disclosed in United States Patent 2,244,513, granted to Burton, June 3, 1941. The foregoing patents are hereby made a part of the present application by reference as if fully set forth herein.

The pulse position modulation system shown in the drawings herein may include suitable level controlling devices as well as level compressors and expanders. This system may also include suitable terminal and switching equipment such as usually employed in telephone and telegraph communication networks. Such equipment frequently includes manual switching offices and equipment, dial switching systems and equipment, toll line switching systems and equipment, toll line transmission facilities including open way lines, cable circuits, channels, carrier current communication circuits, radio circuits, etc., and many or all combinations of these various types of equipment including suitable regulators, repeaters and interconnecting circuits and equipment.

As pointed out above, a single one way system has been shown in the drawings. It will be quite apparent to a person skilled in the art, however, that it is only necessary to duplicate the equipment with transmitting equipment at the receiving station and receiving equipment at the transmitting station in order to provide a two way communication system between the two stations. In this case the pulse position modulation system also includes the necessary hybrid coils or other suitable equipment for separating and combining the transmission in the two directions.

The operation of the foregoing circuits and equipment may be more readily understood by reference to FIGS. 3, 4 and 7 to 12 when arranged as shown in FIG. 2.

Figure 7:
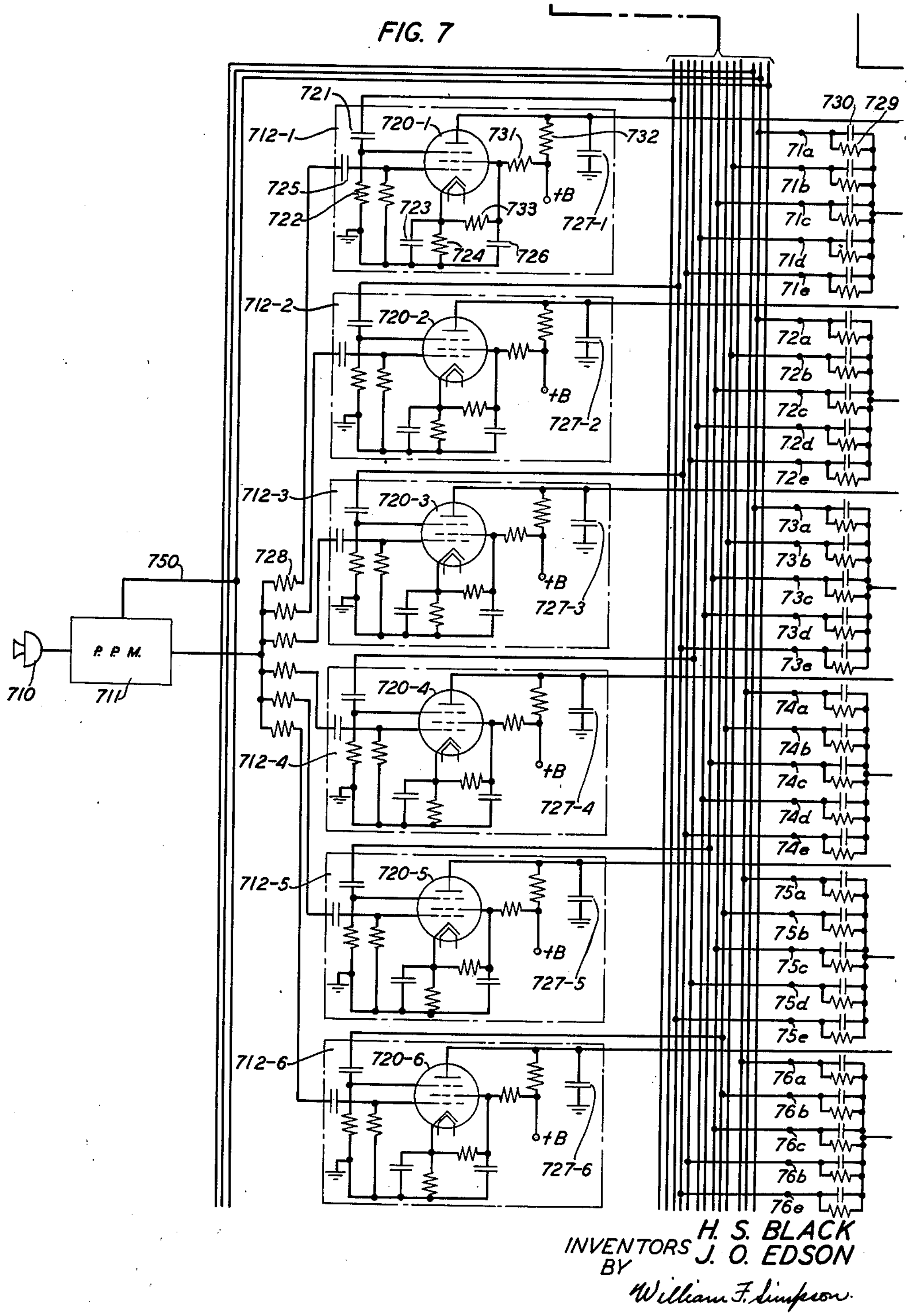

FIG. 7 shows the storage circuits 712–1 to 712–6 in detail. These circuits correspond to the storage circuits 512 shown in FIG. 5 in schematic form. FIG. 7 also shows the manner in which these storage circuits are connected to the multivibrator circuits shown in FIG. 3 and to the pulse position modulation system 711 which corresponds to 511 in FIG. 5.

Pulse postion modulation systems 711, 1011, etc. have control leads 750, 1050, etc. connected to one of the three 8-kilocycle multivibrator circuits 322, 323 or 324. As will be explained hereinafter, the pulse position modulation systems for channels 1, 4 and 7 are controlled from the first 8-kilocycle multivibrator circuit 322. The pulse position modulation systems for channels 2, 5 and 8 are controlled from multivibrator circuit 323, while the pulse position modulation systems for channels 3 and 6 are controlled by multivibrator circuit 324. These pulse position modulation systems are set into operation under control of these multivibrator circuits.

The pulse position modulation systems 711, 1011, etc. associated with the respective channels are each arranged so that pulses transmitted by them will be transmitted during the time the controlling multivibrator circuit 322, 323 or 324 is supplying an output current. In particular, the output pulse from the pulse position modulation system 711 as well as the corresponding pulses individual to channels 4 and 7 will occur during the time multivibrator 322 supplies the output current as illustrated by the broken line 1518 in FIG. 15. Similarly, pulses from the pulse position modulation system 1011 and the corresponding ones individual to channels 5 and 8 occur during the time multivibrator 323 is supplying an output current as illustrated by the broken line 1519 in FIG. 15. Similarly, the pulse position modulation systems individual to channels 3 and 6 will transmit an output current pulse occurring at the time the multivibrator 324 supplies an output current as shown by broken line 1520 in FIG. 15.

It should be noted that with the 8-channel system disclosed herein, it is not necessary for the outputs of each of the pulse position modulation systems to be during times during which no output pulses are generated by the other channels. In other words, with a straight pulse position modulation system, only one-eighth of a complete cycle of the system i.e., one-eighth of the time available for transmission of a complete set of pulses from all of the channels, is available for the transmission of the pulse for any one channel. However, in accordance with the present invention, one-third of the time of a complete cycle of the system is available for the time modulation by the signals of each channel. As can be readily appreciated by a person skilled in the art, arrangements in accordance with the present invention permit either a much greater number of amplitudes, if more information is to be transmitted with a given length of pulse, or else a longer pulse may be employed to convey the same information.

Each of the storage devices 712–1 through 712–6 associated with the first channel and individual to each of the pulses thereof is provided with a multielement electronic discharge device or vacuum tube 720. As illustrated in FIG. 7, a so-called pentode vacuum tube is employed. The so-called "control grid" of this tube is connected through coupling condenser 725 and coupling resistance 728 to the output of the pulse position modulation system. The control grid of each of the other tubes for each of the other pulses to be transmitted representing the output of the pulse position modulation system 711 is likewise coupled to a similar condenser and resistance to the output circuit of the pulse position modulation system of channel 1. Resistances similar to resistances 728 are sometimes called decoupling resistances because they tend to prevent "feed back" or interaction between the various tubes 720–1 to 720–6 and the related circuits 712–1 through 712–6.

The suppressor grid of the pentode 720 is connected through coupling condenser 721 to the positive output of multivibrator 325. The suppressor grids of each of the other pentodes for each of the other pulses for channel 1 is connected to the positive output of the respective multivibrators 326 through 330 inclusive. In other words, the suppressor grid of the vacuum tube of the storage device 712–2 for the second pulse of channel 1 is connected to the positive output of multivibrator 326. The suppressor grid of the corresponding tube for the third pulse is connected to the positive output of multivibrator 327, etc.

The electronic discharge devices in each of the storage circuits are so arranged and biased that no output or anode current flows through them except when both the control grid and the suppressor grid have a positive pulse applied to them. In other words, the bias applied to both the control grid and the suppressor is such that the tube is normally non-conducting and remains non-conducting unless both the control grid and suppressor grid are made more positive than their bias potentials. As shown in FIG. 7, the cathode resistance 724 and condenser 723 and also resistances 731, 732 and 733 provide a suitable arrangement for securing the desired bias potentials in a manner well understood by persons skilled in the art.

It should be noted that sufficient screen current and also other current flows through the resistances 731, 732, 733 and 724 from the +B potential to ground to provide sufficient voltage drops through the respective resistances to provide the necessary bias potentials even when no current flows in the anode-cathode circuit of the tube. The necessary bias potentials for the other storage tubes are obtained in similar manners.

The mode of operation of each of the storage devices 712–1 to 712–6 inclusive when translating a pulse from the pulse position modulation system 711 into a series of permutation code pulses may be more readily understood by reference to FIG. 13. Curve or broken line 1313 of FIG. 13 illustrates the output wave form from multivibrator 325. The other broken lines 1315 through 1323 inclusive similarly show the output wave forms from the multivibrators 326 through 330 inclusive. The output wave forms as shown in FIG. 13 have been drawn with square corners. In actual practice these corners will be rounded to a slight extent. However, such rounding does not interfere with the proper operation of the present system and will vary depending upon the requirements of the system and the output circuits of the multivibrators. Inasmuch as the principles involved may be readily understood from the broken lines shown in FIG. 13 and inasmuch as nothing further would be gained in attempting to show oscillograms of the actual outputs from the various multivibrators, theoretical outputs have been shown in FIG. 13. Oscillograms of actual outputs having substantially the same wave forms as those shown in FIG. 13 have been repeatedly published in technical papers and articles and are well known to persons skilled in the art.

The output of the pulse position modulation system is illustrated at the top of FIG. 13 by pulse 1311 and dotted pulses 1310 and 1312. The pulses 1310 and 1312 indicate substantially the full range times or positions on a time scale during which the output pulse from the pulse position modulation system 711 may occur. This time interval has been shown in be divided into sixty-four pulse intervals and is so designated adjacent broken line 1313. As indicated above, this time interval from pulse 1 through 64 occurs during the third of each 8-kilocycle cycle during which multivibrator 322 supplies an output current as indicated by the upper portion of broken line 1518 of FIG. 15.

As shown in FIG. 13, pulse 1311 occurs during the thirty-third pulse interval. At this time there will be a positive output current from the 768-kilocycle multivibrator 325 as shown by broken line 1313. Similarly, there will be a positive output current from the 384-kilocycle multivibrator 326, from the 192-kilocycle multivibrator 327, from the 96-kilocycle multivibrator 328 and from the 48-kilocycle multivibrator 329 as shown by the upper portions of the respective broken lines 1315 through 1321 in FIG. 13. However, there will be no output positive current from the 24-kilocycle multivibrator 330 as shown by the broken line 1323 of FIG. 13. As pointed out above, it is necessary for a positive potential or pulse to be applied to both the control grid and suppressor grid of the electron discharge tubes in the storage circuits to cause an output current to flow. Consequently, when the pulse position pulse 1311 is applied to the grids of tubes 720–1 and corresponding tubes 720–2 through 720–6, current will flow in the anode circuits of tubes 720–1 through 720–5 but no anode current will flow in the anode circuit of tube 720–6.

Each of the tubes 720–1 through 720–5, however, will conduct current only during the short pulse interval during which the pulse from the pulse position modulation system 711 is applied to their control grids. During this interval of time condenser 727–1 and the corresponding condensers 727–2 through 727–5 become discharged, that is, the potential of the upper terminals of these condensers is reduced to a relatively low value. However, the potential of the upper terminal of condenser 727–6 is not reduced at this time because tube 720–6 does not become conducting as pointed out above because there is no positive current from the 24-kilocycle multivibrator 330 during this pulse interval as illustrated by line 1323 of FIG. 13.

In other words, the pulse in the position 33 as represented by 1311 from the pulse position modulator system is translated into a group of six permutation code pulses in which the first five pulses are spacing, or of one characteristic, and the sixth pulse marking, or of the opposite characteristic. The character of these pulses is stored upon the condensers 727–1 to 727–6 in the manner described above. Upon the completion of pulse 1311 the tubes 720–1 through 720–5 become non-conducting and the upper terminals of condensers 727–1 through 727–5 start to charge to the B battery potential. However, the time constant of condensers 727–1 to 727–6 together with resistance 732 and the corresponding resistances associated with the other condensers is such that the condensers require substantially the entire multiplex cycle to become fully recharged.

The charges on these condensers are then employed to cause transmission of signals over the multiplex system in a manner described hereinafter.

It will be readily understood by persons skilled in the art that if the pulse 1311 received from the pulse position modulating system 711 has been received at some other position or time interval a different series of permutation code pulses may be stored on the condensers 727–1 through 727–6 and the series of pulses would be different for each position of the pulse position modulation pulse. At each of the odd numbered pulse positions the upper terminal of condenser 727–1 is discharged whereas for each of the even numbered pulse positions of the pulse 1311 the upper terminal of condenser 727–1 is not discharged. Similarly, for certain of the pulse positions the upper terminals of the other condensers 727–2 through 727–6 are not discharged while for other pulse positions they are discharged.

Figure 8:
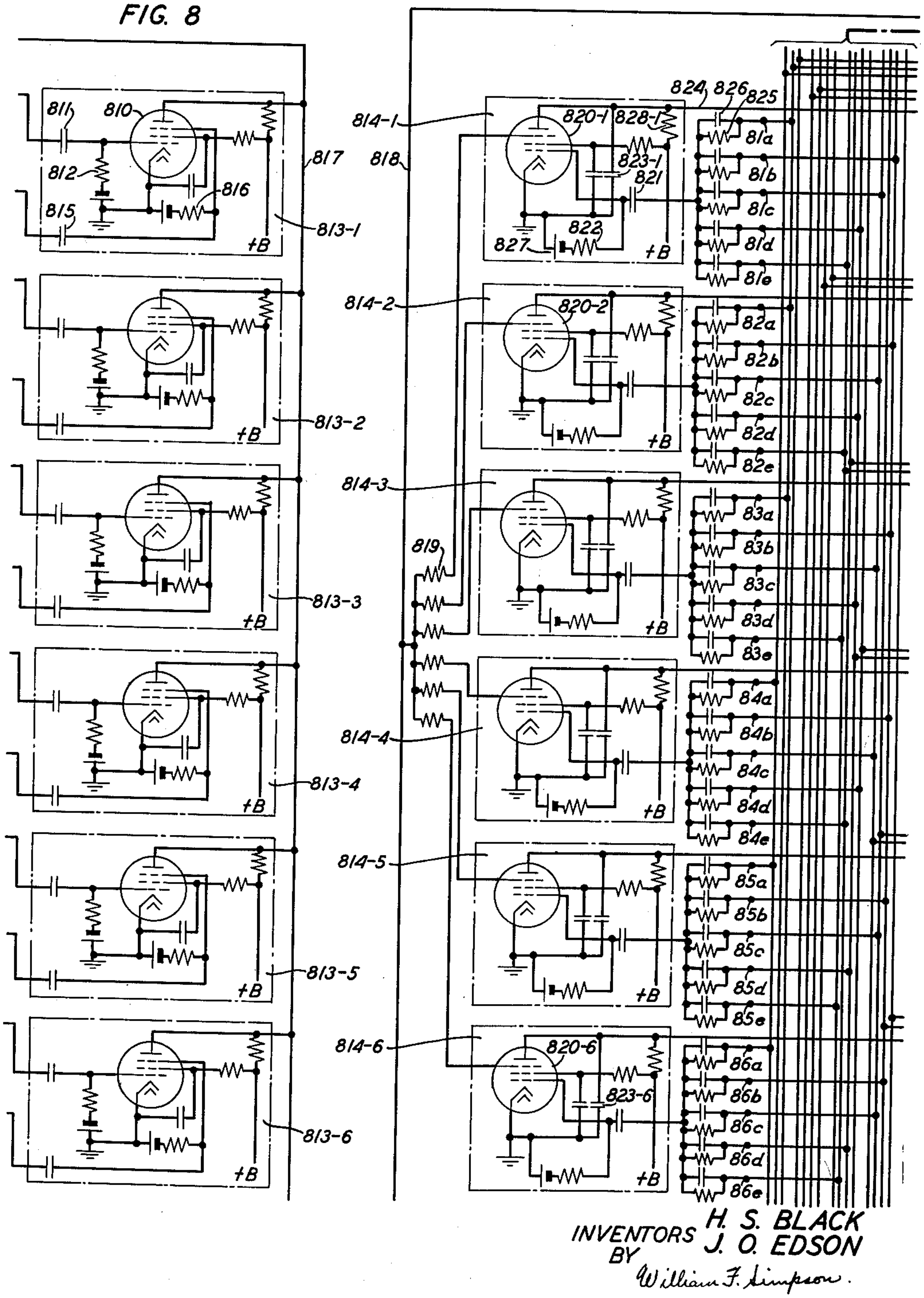

Condensers 727–1 to 727–6 are connected through coupling networks to the control grids of the tubes of the pulse selectors shown in FIG. 8. For the first pulse, condenser 727–1 is coupled through condenser 811 and bias resistor 812 to the control grid of the pentode tube 810 which follows the potential of the upper terminal of condenser 727–1 with a reasonable degree of accuracy. In other words, the potential of the control grid of tube 810 is substantially the same or substantially some large fraction of the potential of the upper terminal of condenser 727–1 at all times. The control grids of the tubes of the other pulse selectors corresponding to tubes 813–2 through 813–6 are similarly connected to the storage condensers 727–2 through 727–6.

The suppressor grid of tube 810 is connected through coupling condenser 815 and also through a group of coupling networks each comprising a resistance and condenser in parallel, as illustrated by condenser 730 and resistance 729, to one of the outputs of multivibrators 322 to 324 and to the outputs of the multivibrators 327 to 330. As shown in FIG. 7, five networks each similar to the network comprising resistance 729 and condenser 730 are connected to condenser 815. The other terminal of the network comprising the elements 730 and 729 and also the similar networks associated with condenser 815 are connected to terminals 71*a*, 71*b*, 71*c*, 71*d* and 71*e*, respectively. These terminals are in turn cross-connected to different output circuits from the various multivibrator circuits. The manner in which the leads 71*a*, through 71*e* are connected to the output circuits of the respective multivibrators or rather to particular output leads to which the terminals are connected determine the position in the multiplex cycle in which the respective pulses are transmitted.

One of the functions of resistance 729 is to prevent or reduce coupling between the output circuits of the multivibrators which are connected to condenser 815 and the corresponding condensers of the other selector circuits. By making resistances 729 relatively high and the common resistance or impedance of condenser 815 and resistance 816 relatively low the stray currents flowing between the output circuits of the multivibrator circuits may be usually reduced to sufficiently low values so these stray currents will not interfere with the operation of the system. In case it is desirable or necessary to further reduce these stray currents the decoupling networks may include filters such as filter 1030 and also an isolating amplifier 1031 or other one-way transmission device.

Condenser 730 and the other condensers similar thereto tend to compensate for effects of the capacity of the suppressor grid to ground and for effects of the stray capacity of the wiring and leads. While filter 1030 and amplifier 1031 have been shown in series with only one network in FIG. 10 it is contemplated that similar devices may be included in and form part of any or all of the other coupling networks. Inasmuch as these devices operate in their usual manner and are well known, detailed description of them and their operation need not be repeated here. For more detailed description of these devices reference is made to Transmission Networks and Wave Filters by Shea, published by Van Nostrand Company in 1923 and the herein identified book by Brainerd et al. and in particular chapters 3, 4, 5 and 7. Both of these books are hereby made a part hereof as if fully set forth herein.

As pointed out above, the pulse modulation system 711 is connected to and controlled by one of the multivibrators 322 through 324. In the exemplary embodiment of this invention shown in the drawing the pulse position modulation system 711 is connected to and controlled by the output from the multivibrator 322. The first terminal **71*a* may then be connected to the output of either of the other two multivibrators 323 or 324. Likewise, each of the first leads or terminals 72*a*, 73*a*, 74*a*, 75*a* and 76*a* is connected to the output of either multivibrator 323 or 324, but not 322. As is shown in the drawing, the first terminals 71*a*, 72*a* and 73*a* of the first three pulse storage circuits are connected to the output of multivibrator 323 and the corresponding associated terminals with the last three pulse storage circuits are connected to the output of multivibrator 324. This means that the first three pulses would be transmitted some time during the second third of each cycle of the 8-kilocycle control frequency. The last three pulses will be transmitted during the last third of each cycle of the 8000-cycle frequency or code cycle of the multiplex system. Inasmuch as the pulse position modulation system 711** is arranged to transmit its pulse during the first third of the cycle or revolution of the multiplex system, the code pulses determined by its output cannot be transmitted over the multiplex during this third because the particular pulses to be transmitted may not be determined until the end of this time.

The other four leads from the pulse selective circuits 813–1 through 813–6 are connected to either the positive or negative output leads of the multivibrator circuits 327, 328, 329 and 330 such that none of the leads for any two or more of the pulses are all connected to the same output leads of the multivibrator circuits. Each of these leads or terminals **71*b* through 71*e* for pulse No. 1 and corresponding leads for the other pulses of the first channel are thus connected to the outputs of the multivibrators 327 to 330**.

Condenser 815 is connected to the suppressor grid of tube 810. A bias potential is applied to the suppressor grid of tube 810 of such a value that tube 810 is maintained in a non-conducting condition by the suppressor grid, except when the outputs to which terminals **71*a* through 71*e* are connected are all positive. At this time the positive potential from these leads as applied through condenser 815 causes a sufficient potential drop across resistance 816 to raise the potential of the suppressor grid of tube 810** sufficiently to permit current to flow through the anode and cathode circuits of this tube.

However, in order for a current to flow in the output circuit of tube 810 the grid of tube 810 must also have a potential sufficiently positive to permit current to flow through tube 810. If the potential of the upper terminal of condenser 727–1 has been reduced by having a pulse stored upon the upper terminal in the manner described above, tube 810 will not pass any current through its anode cathode circuit independently of whether or not the potential on the suppressor grid is sufficiently positive to permit current to flow. Under the assumed set of conditions no current will flow through tube 810 for any of the corresponding tubes or pulses 1 through 5 of the first channel because the potential of the upper terminals of condensers 727–1 through 727–5 have been reduced by having a pulse stored in these condensers in the manner described above. However, in the case of the tube associated with the number 6 pulse or channel, a pulse will be transmitted when the suppressor grid is made positive by having a positive potential applied to it through the associated coupling networks from the output circuits from the various multivibrators as described above. When the connections are as shown in FIG. 7, number 6 pulse will be sent over the multiplex channel in the 38th position of a 48-pulse multiplex cycle.

If pulses are transmitted from each one of the pulse selector circuits indicating a pulse for each of the six pulses of the permutation code of pulses, the pulses will be transmitted during the following intervals of a multiplex cycle, 17, 18, 19, 36, 37 and 38, respectively, when terminals **71*a* through 71*e*** are connected as shown in FIG. 7. A typical manner of connecting the various terminals to the various outputs of the multivibrator circuits together with the multiplex pulse interval during which the corresponding pulses will be transmitted over the multiplex system is shown in the following table:

| Channel and Pulse | Multiplex Pulse | Cross-Connection Terminals and Leads | | | | | Pulse, Position Coding Period |
|---|---|---|---|---|---|---|---|
| | | *a* | *b* | *c* | *d* | *e* | |
| 1—1 | 17 | 8-*b* | 24+ | 48+ | 96+ | 192+ | 1-8*a* |
| 1—2 | 18 | 8-*b* | 24+ | 48+ | 96+ | 192− | 1-8*a* |
| 1—3 | 19 | 8-*b* | 24+ | 48+ | 96− | 192+ | 1-8*a* |
| 1—4 | 36 | 8-*c* | 24+ | 48+ | 96− | 192− | 1-8*a* |
| 1—5 | 37 | 8-*c* | 24+ | 48− | 96+ | 192+ | 1-8*a* |
| 1—6 | 38 | 8-*c* | 24+ | 48− | 96+ | 192− | 1-8*a* |
| 2—1 | 1 | 8-*a* | 24+ | 48+ | 96+ | 192+ | 2-8*b* |
| 2—2 | 35 | 8-*c* | 24+ | 48+ | 96− | 192+ | 2-8*b* |
| 2—3 | 2 | 8-*a* | 24+ | 48+ | 96+ | 192− | 2-8*b* |
| 2—4 | 34 | 8-*c* | 24+ | 48+ | 96+ | 192− | 2-8*b* |
| 2—5 | 3 | 8-*a* | 24+ | 48+ | 96− | 192+ | 2-8*b* |
| 2—6 | 33 | 8-*c* | 24+ | 48+ | 96+ | 192+ | 2-8*b* |
| 3—1 | 5 | 8-*a* | 24+ | 48− | 96+ | 192+ | 3-8*c* |
| 3—2 | 6 | 8-*a* | 24+ | 48− | 96+ | 192− | 3-8*c* |
| 3—3 | 23 | 8-*b* | 24+ | 48− | 96− | 192+ | 3-8*c* |
| 3—4 | 24 | 8 *b* | 24+ | 48− | 96− | 192− | 3-8*c* |
| 3—5 | 7 | 8-*a* | 24+ | 48− | 96− | 192+ | 3-8*c* |
| 3—6 | 22 | 8-*b* | 24+ | 48− | 96+ | 192− | 3-8*c* |
| 4—1 | 45 | 8-*c* | 24− | 48− | 96+ | 192+ | 1-8*a* |
| 4—2 | 44 | 8-*c* | 24− | 48+ | 96− | 192− | 1-8*a* |
| 4—3 | 43 | 8-*c* | 24− | 48+ | 96− | 192+ | 1-8*a* |
| 4—4 | 27 | 8-*b* | 24− | 48+ | 96− | 192+ | 1-8*a* |
| 4—5 | 25 | 8-*b* | 24− | 48+ | 96+ | 192+ | 1-8*a* |
| 4—6 | 26 | 8-*b* | 24− | 48+ | 96+ | 192− | 1-8*a* |
| 5—1 | 48 | 8-*c* | 24− | 48− | 96− | 192− | 2-8*b* |
| 5—2 | 12 | 8-*a* | 24− | 48+ | 96− | 192− | 2-8*b* |
| 5—3 | 47 | 8-*c* | 24− | 48− | 96− | 192+ | 2-8*b* |
| 5—4 | 11 | 8-*a* | 24− | 48+ | 96− | 192+ | 2-8*b* |
| 5—5 | 46 | 8-*c* | 24− | 48− | 96+ | 192− | 2-8*b* |
| 5—6 | 10 | 8-*a* | 24− | 48+ | 96+ | 192− | 2-8*b* |
| 6—1 | 21 | 8-*b* | 24+ | 48− | 96+ | 192+ | 3-8*c* |
| 6—2 | 8 | 8-*a* | 24+ | 48− | 96− | 192− | 3-8*c* |
| 6—3 | 29 | 8-*b* | 24− | 48− | 96+ | 192+ | 3-8*c* |
| 6—4 | 31 | 8-*b* | 24− | 48− | 96− | 192+ | 3-8*c* |
| 6—5 | 16 | 8-*a* | 24− | 48− | 96− | 192− | 3-8*c* |
| 6—6 | 4 | 8 *a* | 24+ | 48+ | 96− | 192− | 3-8*c* |
| 7—1 | 32 | 8-*b* | 24− | 48− | 96− | 192− | 1-8*a* |
| 7—2 | 30 | 8-*b* | 24− | 48− | 96+ | 192− | 1-8*a* |
| 7—3 | 40 | 8-*c* | 24+ | 48− | 96− | 192− | 1-8*a* |
| 7—4 | 39 | 8-*c* | 24+ | 48− | 96− | 192+ | 1-8*a* |
| 7—5 | 28 | 8-*b* | 24− | 48+ | 96− | 192− | 1-8*a* |
| 7—6 | 20 | 8-*b* | 24+ | 48+ | 96− | 192− | 1-8*a* |
| 8—1 | 41 | 8-*c* | 24− | 48+ | 96+ | 192+ | 2-8*b* |
| 8—2 | 9 | 8-*a* | 24− | 48+ | 96+ | 192+ | 2-8*b* |
| 8—3 | 15 | 8-*a* | 24− | 48− | 96− | 192+ | 2-8*b* |
| 8—4 | 13 | 8-*a* | 24− | 48− | 96+ | 192+ | 2-8*b* |
| 8—5 | 14 | 8-*a* | 24− | 48− | 96+ | 192− | 2-8*b* |
| 8—6 | 42 | 8-*c* | 24− | 48+ | 96+ | 192− | 8-8*b* |

As is apparent to persons skilled in the art many other arrangements of cross-connections may be employed to transmit the respective pulses from each channel during many of the other pulse intervals of the multiplex cycle, the only limitations being, as pointed out above, that the pulses from any channel cannot be transmitted over the multiplex system during the time the character of the pulses to be transmitted is being determined. Of course the pulses from each channel could be arranged in a more orderly and systematic fashion with most of the pulses of each of the channels following one another in succession. Such an arrangement, however, would make it relatively easy for any radio receiver to receive and decipher the pulses sufficiently to understand the conversation of the respective channels the pulses of which are so transmitted. In order to provide a private communication channel, therefore, it is desirable to intermingle the pulses of the different channels in a random manner and also interchange the pulses within the channel.

When this is done it becomes extremely difficult for the pulses to be deciphered unless the manner in which they are intermingled is definitely known at the receiving station.

If it is desirable to further increase the privacy or secrecy of the communication channel it may be desirable to arrange the cross-connections so that they may be readily changed from time to time both at the transmitting point and at the receiving point. In order to facilitate the rapid change in cross-connections each of the coupling networks has been brought out to separate terminals **71*a* to 71*e*** and also for each of the other pulses of all of the other channels. If desired the cross-connection between these terminals and the outputs of the multivibrator circuits as described above may be made upon a temporary basis by means of keys, jacks and plugs or other similar devices in which case the cross-connection may be readily changed from time to time as may be desired.

As will be readily appreciated by persons skilled in the art, the oftener these cross-connections are changed the greater the secrecy or the less chance of having the information transmitted over the radio or other communication channel deciphered by unauthorized persons.

The manner in which the outputs of the various multivibrators are employed to control the time during which the various pulses are transmitted may be more readily understood by reference to FIG. 15 in the drawing. As indicated in the above table the first pulse of the first channel is transmitted during the seventeenth multiplex pulse interval which is illustrated by a dotted line 1521. As indicated in FIG. 15 in the seventeenth pulse interval the positive output on each of the multivibrators 327, 328, 329, 330 and 323 is in its positive half cycle. Consequently, the terminals **71*a* through 71*e*** will be connected to the positive outputs of these multivibrators. Then during the seventeenth pulse interval and only during the seventeenth pulse interval will all the potentials applied to these terminals by the respective multivibrators be positive. Consequently, the first pulse of channel number 1 can only be transmitted during the seventeenth pulse interval of the multiplex channel.

As indicated in the above table the second pulse interval will be transmitted during the eighteenth pulse interval in the multiplex transmission cycle. This will occur at the time illustrated by the dotted line 1522 in FIG. 15. In this case it should be noted that the negative output from the multivibrator 327 will be in its positive half cycle. The outputs of the other vibrators 328 through 330 will still all be positive. Consequently, terminals **72*b* to 72*e* will be connected as illustrated in the above table to the positive outputs on the multivibrators 328 through 330 and to the negative output of multivibrator 327. Terminal 72*a* as indicated above will be connected to the output of multivibrator 323. In a similar manner the other terminals 73*a* through 73*e*, 74*a* through 74*e***, etc., are connected to the various output circuits of the multivibrators as set forth in the above table.

As indicated hereinbefore the multivibrator circuits 327 through 330 are each provided with a positive and a negative output circuit. The output current of the positive and negative output circuits is shown in FIG. 15. For multivibrator 327 the broken line 1510 illustrates the positive output current and broken line 1511 illustrates the negative output of current. By positive and negative it is merely meant the relative phases or signs of the output and does not necessarily indicate the absolute polarity or magnitude of the output current. In other words, when the positive output increases to a more positive value the negative output will decrease to a more negative value. Similarly when the positive output falls to a low positive value or to an actual negative value the negative output will rise to a positive value or become less negative. The actual zero potential and thus the absolute polarity of the output is usually controlled by means of a bias resistor and coupling condenser as is well understood by persons skilled in the art. Positive and negative outputs are of opposite phase and the terms are employed herein to indicate this fact rather than the absolute polarity or magnitude of the output currents. The broken lines shown in FIG. 15 have been drawn with square corners similar to the curves shown in FIGS. 13 and 14 for the purpose of illustrating the manner of operation of the system. As pointed out hereinbefore in actual practice the corners will probably be slightly rounded. This rounding is a function of the constants of the amplifier circuits and in general will not interfere with the operation of the system. However, the sharpness of the corners may be controlled as desired by the number of stages and design of the amplifier tubes and circuits as is well understood in the art. The output circuits of the pulse selection tubes for all of the channels are connected to the video amplifier 310. This amplifier is controlled by the combined output of the selector circuits and the output of the pulse generator 320, which is controlled by oscillator 321 in such a manner as to properly shape the pulses and control the length of the transmitted pulses. The amplifier 310 applies amplified and properly shaped pulses to a radio transmitter 311 which causes the pulses to be transmitted to a distant receiver station shown in FIG. 4 where the radio receiver 412 responds to them and transmits them to a second video amplifier 410.

The exemplary system set forth in detail herein employs a radio channel for transmission between the transmitting and receiving stations. Of course, any other suitable transmission path may be employed for the transmission of the signals, such as for example, transmission paths over coaxial cables, wave guides, other cable circuits, and transmission lines, and also carrier communication lines and systems, etc., or any combination of these different types of systems. These systems may include any of the usual equipment employed with them including loading coils, amplifiers, repeaters, gain control and phase control circuits and interconnecting equipment. Inasmuch as these circuits operate in their usual manner and are well understood by persons skilled in the art a detailed description of them need not be repeated here.

The output of the video amplifier 410 extends to the phase control circuit 420 which in turn controls the frequency of the controlling oscillator 421 so as to maintain the output of oscillator 421 in synchronism with the received signaling pulses.

The frequency of the control oscillator 421 is maintained in any suitable manner as is well understood by persons skilled in the art including a separate synchronizing channel or over the signalling channel. Consequently it is unnecessary to describe the details of this equipment or its mode of operation herein. For a more detailed description of equipment of this type reference is hereby made to one or more of the following United States patents: 1,476,721, Martin, December 11, 1923;

1,660,389, Matte, February 28, 1928; 1,684,455, Nyquist, September 18, 1928; 1,740,491, Affel, December 24, 1929; 1,788,533, Marrison, January 13, 1931; 1,931,873, Marrison, October 24, 1933; 2,087,326, Marrison, July 20, 1937; 2,163,403, Meacham, June 20, 1939; and 2,275,452 Meacham, March 10, 1942.

The disclosures of the foregoing patents are hereby made a part of the present application as if fully included herein.

Figure 11:
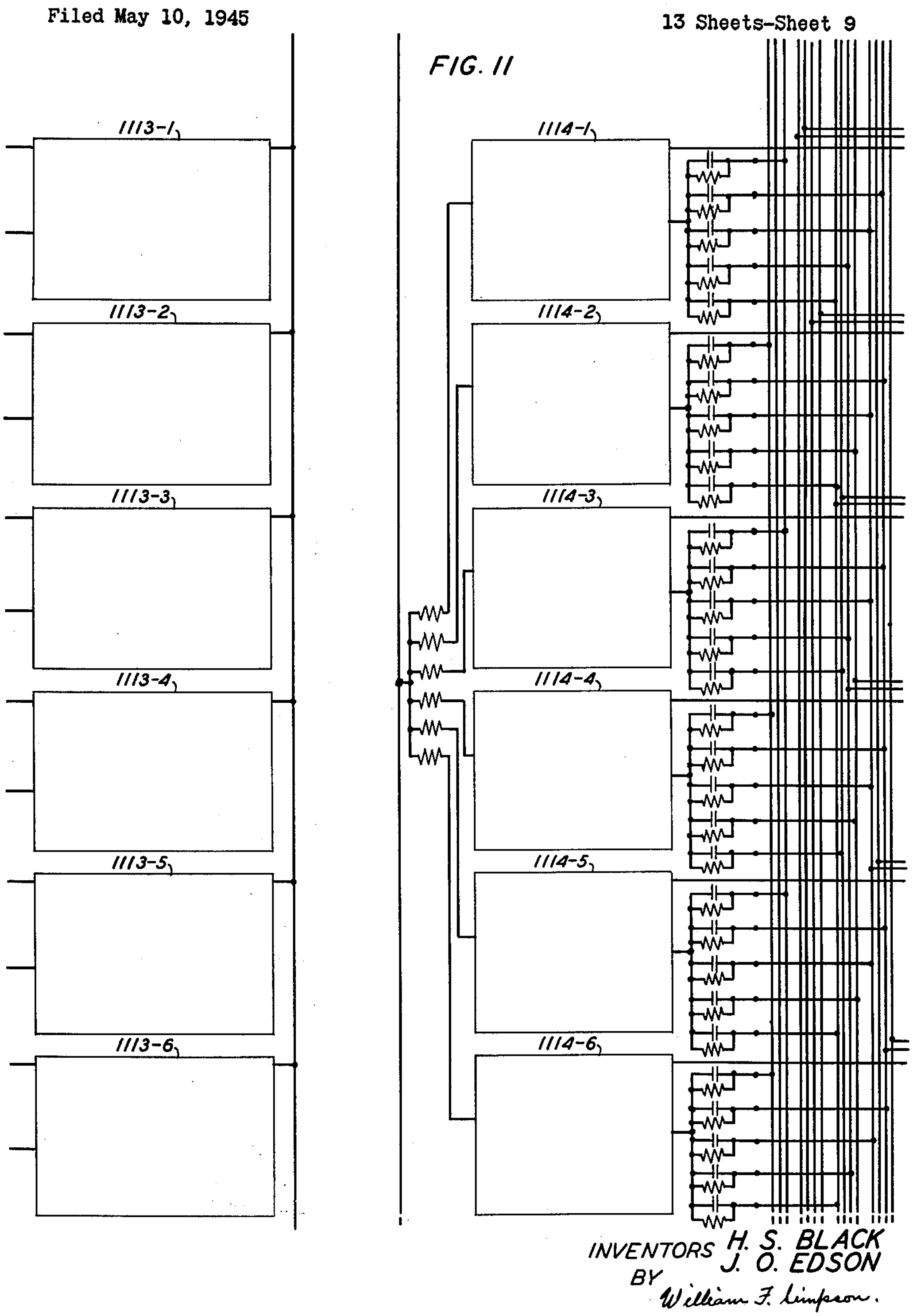
Figure 12:
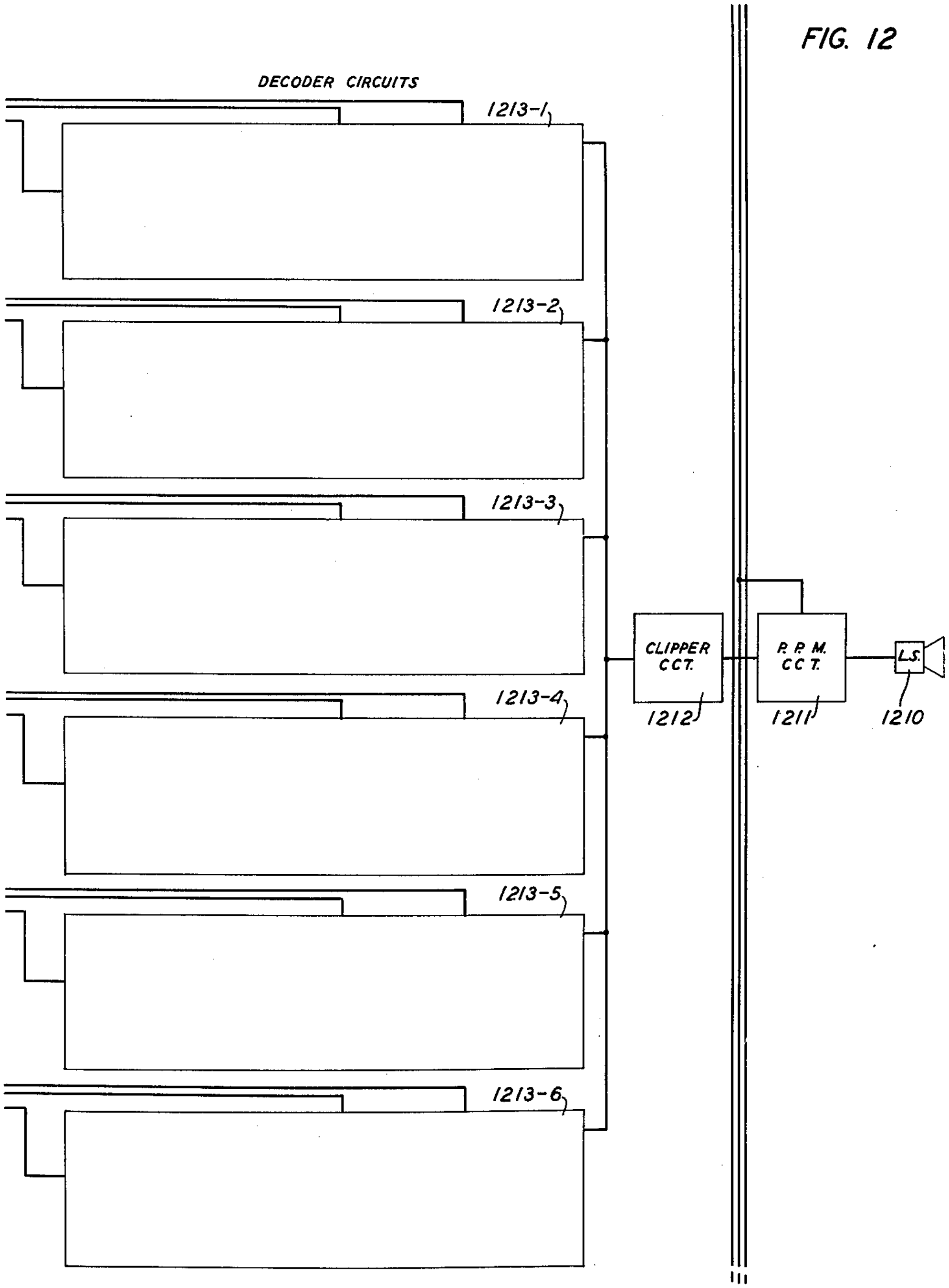

The output of video amplifier 410 also extends to the storage circuits at the receiving terminal designated 614, 624, etc. in FIG. 6 and 814–1 through 814–6 in FIG. 8 and 1114–1 through 1114–6 in FIG. 11. The output of the amplifier 410 also extends to the storage circuits associated with all of the other channels of the multiplex system.

Each one of the storage circuits, such as 814–1, includes an electron discharge device or vacuum tube 820–1 which in the exemplary embodiment of the invention described herein comprises a so-called pentode tube. In this case the output of the video amplifier 410 is connected through the coupling resistance 819 to the so-called suppressor grid of tube 820–1.

As in the case of the tubes at the transmitting terminal the suppressor grid and control grid of tube 820–1 are provided with biasing potentials which are sufficiently negative to prevent current from flowing through the anode circuit of the tube unless positive pulses or other positive potentials of sufficient magnitude are simultanenously applied to both of these grids.

It will be apparent to persons skilled in the art that the system will work equally well when the output of the video amplifier 410 is connected through the coupling network to the control grid of tube 820 instead of to suppressor grid because the functions of these two grids may be interchanged in the circuits set forth herein. Inasmuch as it is necessary to have a positive pulse or other positive potential applied to both of these grids simultaneously in order to overcome the bias potentials normally applied to these elements to cause current to flow in the anode circuit, it is immaterial to which one of the grids a particular one of the two sources of pulses or other potentials may be applied. The foregoing remarks apply equally well to the tubes 720 and 810 at the transmitting end of the systems. In these tubes likewise the connections to the suppressor grid and the control grids may be reversed providing of course the proper biasing potentials are maintained on the respective control elements.

The control grid of tube 820–1 is connected through a coupling condenser 821 and the coupling network comprising resistance 825 connected in parallel with condenser 826 to the output circuit of multivibrator circuit 423, as shown in the drawing. The network comprising resistance 825 and condenser 826 are similar to the network comprising resistance 729 and condenser 730 and function to reduce the coupling between the output circuits of the multivibrators connected to condenser 821 and similar condensers of the other storage circuits. These networks may include filters and filter elements or sections as well as vacuum tubes as pointed out above. The multivibrator circuits 425 through 430 and 422 through 424 are controlled by means of oscillator 421 in the same manner as the multivibrator circuits 322 through 330 at the transmitting station. Similarly the multivibrator circuits 422 through 430 operate at the same frequency as the corresponding multivibrator circuits 322 through 330 at the transmitting end of the line.

In addition the control grid of tube 820–1 is connected through the coupling networks pointed out above to the terminals **81*a* through 81*e* and the terminals 81*a* through 81*e* are connected to the corresponding output terminals of the multivibrator having the same fundamental frequencies as are the terminals 71*a* through 71*e* at the transmitting end of the system. Consequently, the control grid of tube 820–1 has applied thereto the same instantaneous total voltage or wave form as is applied to the suppressor grid of tube 720–1. Likewise the control grids of the succeeding storage tubes at the receiving end are connected to the output circuits of the multivibrators 422 to 430 in the same manner as the suppressor grids of corresponding pulse selecting tubes are connected to the output circuits of the multivibrators 322 to 330 at the transmitting terminal. Thus, when the potential applied to the suppressor grid of tube 720–1 overcomes bias sufficiently to permit current to flow in the output circuit of this tube the potential applied to the control grid of tube 820–1 will likewise overcome the biasing potential applied thereto by means of battery 827 and resistance 822 sufficiently to permit current to flow through the output circuit of tube 820–1**.

If at this time a pulse of the proper type or polarity is received through the video amplifier 410 the potential applied to the suppressor grid of tube 820–1 will likewise permit current to flow through this tube and cause condenser 823–1 to become discharged, that is, the potential of the upper terminal of condenser 823–1 is reduced. Under the assumed conditions where the potential upon the upper terminal of condenser 727–1 was reduced so that a no-current pulse was transmitted by tube 710 when its suppressor grid was sufficiently positive during the 17th pulse interval of the multiplex cycle, a no-current pulse will be received and transmitted through the video amplifier during the time the control grid of tube 820–1 is sufficiently positive to permit current to flow in the output circuit of tube 820–1. However, the output of video amplifier at this time wil be sufficiently positive to cause current to flow in the output circuit of tube 820–1. When current pulses are transmitted from the transmitting station and amplified by the video amplifier 410 the pulses will cause the output potential of this amplifier to be decreased so that current will not flow in the output circuit of the corresponding storage tube activated at this time.

Consequently, under the assumed conditions the upper terminal of condenser 823–1 will be discharged at this time. At the succeeding pulse intervals during which the pulses corresponding to the other five pulses of channel 1 are received, the corresponding potentials applied to the control grids will permit current to flow in the output circuits of the respective tubes providing positive pulses are received from the video amplifier at the corresponding time. Under the assumed set of conditions, however, pulses of no current will be received at times corresponding to the times assigned to the first five tubes, that is, pulses of no current will be received during the 17th, 18th, 19th, 36th or 37th pulse intervals of the multiplex cycle because pulses of no current will be transmitting during these time intervals from the corresponding storage circuits 813–1 through 813–5 at the transmitting station as pointed out above. Thus, the output of video amplifier 410 will be sufficiently positive at these times to cause current to flow in the output circuits of tubes 820–2 through 820–5 and discharge the upper terminal of the corresponding condensers 823–2 through 823–5. However, a pulse of current will be transmitted during the 38th multiplex interval from the storage circuit 813–6. This pulse will be received at the receiving station during the time the potential applied to the control grid of the storage circuit 814–6 is sufficiently positive to permit current flow in the output circuit of tube 820–6. However, the pulse received at this time will cause the output of video amplifier to be reduced so that no current will flow through the output circuit of tube 820–6. Consequently, the upper terminal of condenser 823–6 will not be discharged. Thus, the upper terminals of condensers 823–1 through 823–6 inclusive are discharged or not discharged depending upon whether or not the corresponding condensers 727–1 through 727–6 of the transmitting station were also discharged or not depending upon the code combination of pulses transmitted. Under the assumed set of conditions therefore the upper terminals of condensers 823–1 through 823–5 will be discharged, while the upper terminal of condenser 823–6 will not be discharged. Condenser 823–1 after being discharged by the action tube 820–1 as described above will start to charge through the high resistance 828–1. However, the time constants of condenser 823–1 and resistance 828–1 are such that it requires substantially an entire multiplex cycle or frame to become fully charged. The other condensers 823–2 through 823–5 are charged in a similar manner and at a similar rate. Consequently these condensers will be still sufficiently discharged at the time it is desired to employ this potential for decoding purposes as will be described hereinafter.

The storage circuits 814–1 through 814–6 are connected to the corresponding decoding circuits 913–1 through 913–6. Condenser 823–1 is connected through the coupling condenser 921–1 to the control grid of the left-hand section of tube 920–1. The time constants of the coupling condenser 921–1 and the grid resistance 922–1 are such that the potential on the grid of the left-hand section of tube 920–1 follows the potential of the upper terminal of condenser 823–1 with little or no distortion. Consequently, the wave form in the potential applied to the left-hand control grid of tube 920–1 is substantially the same as the wave form of the upper terminal of condenser 823–1.

The output of the left-hand section of tube 920–1 is connected to the grid of the right-hand section of the tube 920–1 and also to the control grid of tube 931–1. The elements of both sections of tube 920–1 are provided with suitable bias potentials so that both sections of this tube act as limiting amplifiers. (See FIGS. 6–8, page 282, of Ultra-high Frequency Techniques by Brainerd, Koehler, Reich and Woodruff.) Thus by connecting the output of the left-hand section to the input of the right-hand section, the right-hand section becomes a phase inverting section so that the output from the right-hand section is opposite in phase to the output of the right-hand section. The output of the left-hand section is connected through the coupling condenser 927 to the control grid of tube 932–1. Coupling networks between the various tubes are designed to cause the grids of the following tubes to have applied to them substantially the same wave as is applied to the inputs of the preceding tube from condenser 823–1 except that the wave form is "clipped" or "limited" by the action of tube 920–1 so that the outputs of the wave forms are substantially flat topped. Due to the phase inverting action of the righ-hand section of tube 920–1 when a positive potential is applied to the control grid of tube 931–1 a negative potential will be applied to the control grid of tube 932–1. Similarly when a positive potential is applied to the control grid of tube 932–1 a negative potential will be applied to the control grid of tube 931–1.

The suppressor grid of tube 931–1 is connected through a coupling condenser 925 to the positive output terminal of multivibrator 425 while the suppressor grid of tube 932 is connected through the coupling condenser 927 to the negative output of the multivibrator 425.

The tubes 931–1 and 932–1 are biased so that positive pulse or positive potential has to be applied to both the control grid and suppressor grid of each of these tubes in order to permit it to pass current. However, due to the action of the right-hand section of tube 920–1 it is impossible for both of these tubes to pass current at the same time.

The tubes of the decoding circuits for each of the succeeding pulses are connected in a manner similar to that described above with respect to the decoding circuit 913–1 for decoding the first pulse from the received permutation code pulses. However, the suppressor grids of the tubes of the second decoding circuit 913–2 are connected through coupling networks to the positive and negative output circuits of the multivibrator 426. The corresponding grids of the tubes of each of the succeeding decoding circuits are connected to the outputs of the respective multivibrators 427 through 430 as shown in the drawing.

The action of the decoding circuits 913–1 through 913–6 in regenerating a pulse position modulation pulse from the received and stored pulses of the permutation code may be more readily understood by reference to FIG. 14 of the drawing where the curves or graphs 1413 and 1414 show the respective positive and negative output wave forms of the multivibrator circuit 425. Curves 1415 and 1416 show the respective positive and negative output wave forms of multivibrator 426. Likewise curves 1417 and 1418 show the output wave forms of multivibrator 427, curves 1419 and 1420 show output wave forms of multivibrator 428, curves 1421 and 1422 show the output wave forms of multivibrator 429 and curves 1423 and 1424 show the output wave forms of multivibrator 430. Here again the curves of FIG. 14 have been shown as rectangular but in practice they may be slightly rounded without interfering with the operation of the system.

Tubes 920–1, 931–1 and 932–1 are employed to select, under control of the received signals, either the positive or negative output wave form from the multivibrator 425. Likewise, tubes 920–2, 931–2 and 932–2 are employed to select either the positive or the negative output wave form from the multivibrator 426 under control of received signals. The other tubes in the other decoding circuits 913–3 through 913–6 likewise select either the positive or the negative output from the multivibrator circuits 427 through 430.

Assume that the code combination described above is stored on condensers 823–1 through 823–6, i.e., the upper terminal of each of the first five of these condensers is discharged. The potentials of the control grids of the left-hand sections of tubes 920–1 through 920–5 will be, therefore, at a low value. Consequently, very little current will flow in the anode circuits in the left-hand sections of these tubes. This means that very little current will flow through the output resistances 934–1, etc. As a result, the grid of the right-hand section of tube 920–1 as well as the grid of tube 931–1 will be more positive. The grid of the right-hand section of tube 920–1 being more positive means that an appreciable output current flows in the output circuit of this tube and thus through resistance 935–1 causing a large potential drop through this resistance which in turn reduces the potential of the grid of tube 932–1. Under these circumstances, tube 931–1 will act as an amplifier while tube 932–1 is cut off. Consequently, tube 931–1 will repeat the positive output wave form of multivibrator 425 to the limiting and clipping amplifier circuit 912. In a similar manner the decoding circuits 913–2 through 913–5 will repeat the positive output wave forms from the multivibrators 426 through 429, inclusive, to the limiting amplifier 912 because the upper terminal of the corresponding condensers 823–2 through 823–5 has been discharged.

In the case of the final decoding circuit 913–6 the negative output of the multivibrator 430 will be repeated to the limiting amplifier 912. Due to the fact that the upper terminal of condenser 823–6 has not been discharged as described above, the grid of the left-hand section of tube 920–6 will be more positive. Consequently, appreciable output current will flow in the output circuit of the left-hand section of this tube which in turn causes a negative potential to be applied to the grid of the right-hand section as well as to the grid of tube 931–6 to be maintained at a negative or relatively low positive potential. With the grid of the right-hand section of tube 920 maintained at a low value, substantially no output current will flow in the output circuit of this tube. Consequently, the grid of tube 932–6 will be maintained at a more positive value. Under these circumstances, with the grid of tube 931 maintained negative and the grid of tube 932 maintained positive the negative output of the multivibrator 430 will be repeated by tube 932, whereas the positive output will be cut off due to the blocking of tube 931–1.

Referring now to FIG. 14, it should be noted that during the thirty-third pulse interval the positive output of the 768-kilocycle multivibrator 425, the positive outputs of the 384-kilocycle multivibrator 426, the 192-kilocycle multivibrator 427, the 96-kilocycle multivibrator 428, the 48-kilocycle multivibrator 429 and the negative output of the 24-kilocycle multivibrator 430 are all positive. It should be further noted that this is the only pulse interval during which all of the respective output currents or wave forms of current or voltage enumerated above are positive. Consequently, during this pulse interval the maximum output will be applied to the clipping circuit 912. Clipping or limiting amplifier 912 is arranged so that it amplifies or repeats only the maximum output applied to it. Consequently, it will repeat a pulse during the thirty-third pulse interval illustrated by pulse 1411 in FIG. 14. This pulse is then repeated to the pulse position modulation system 911 where it is converted into ordinary speech in the usual way and transmitted to the output device 910.

Figure 9:
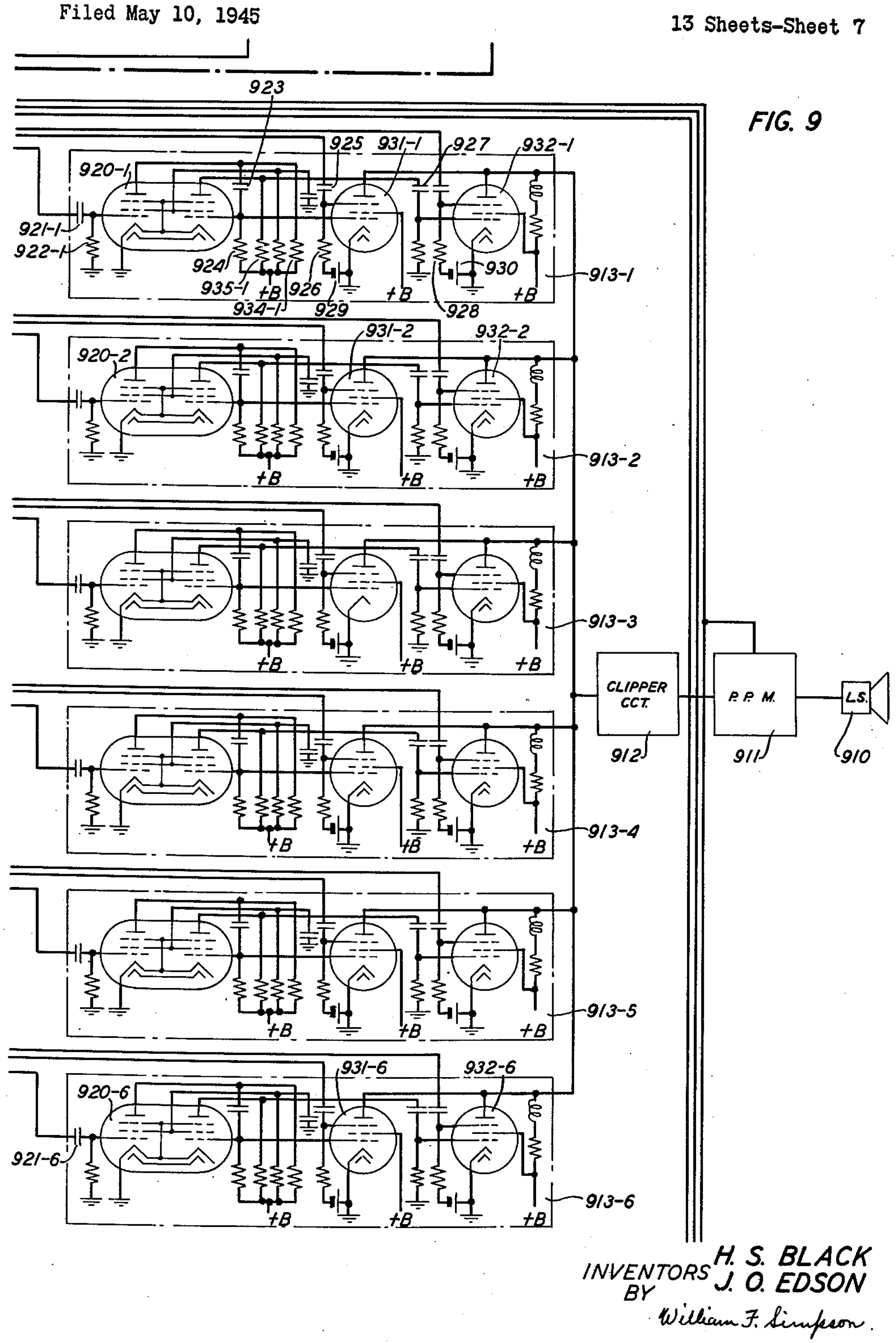
Figure 10:
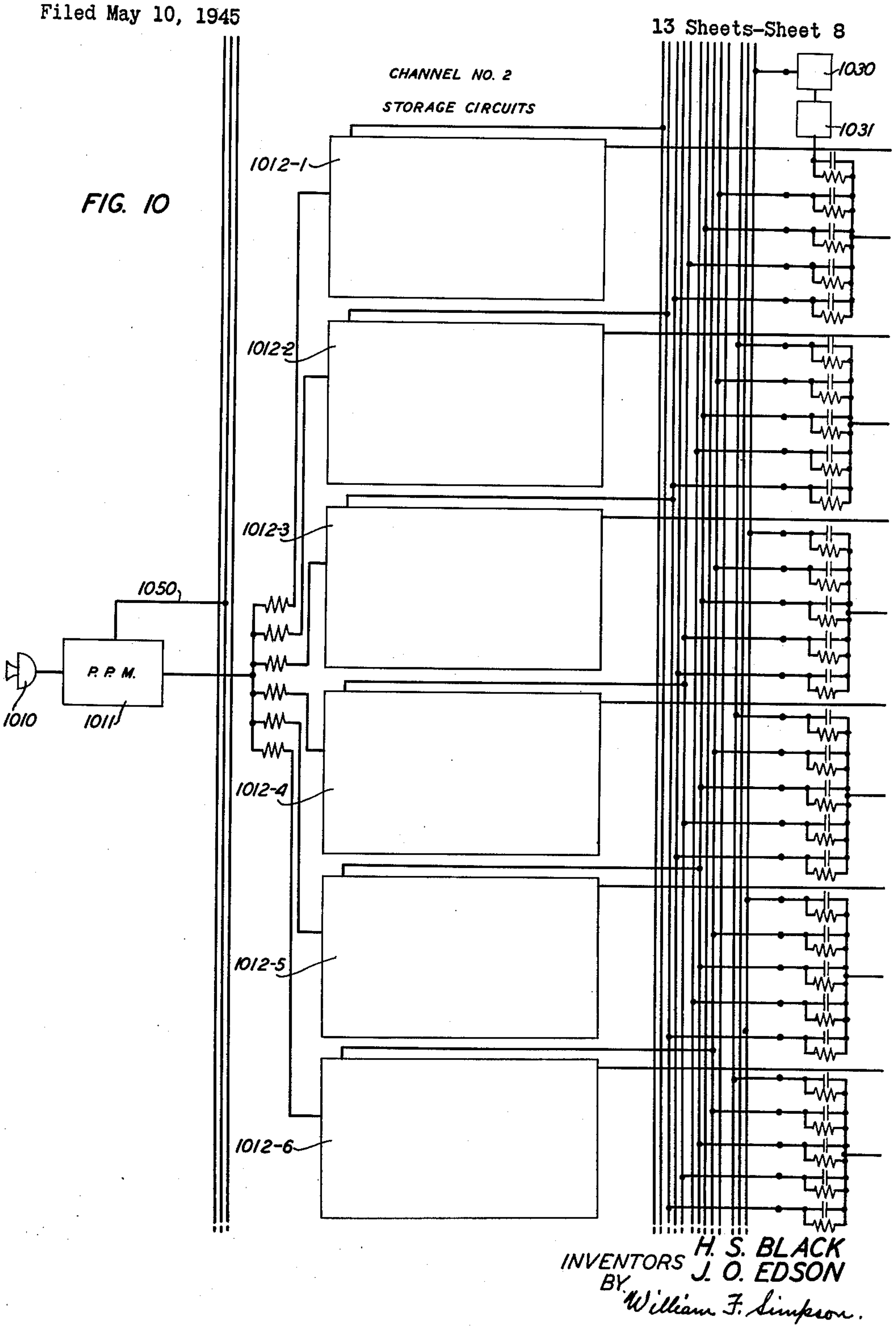

Either the clipping amplifier 912 or the pulse position modulation system 911 as shown in FIG. 9 is connected to the output circuit of multivibrator 422. This connection is for the purpose of selecting only the proper one of the output pulses from amplifier 912. As pointed out above, during two-thirds of each cycle of the multiplex system pulses are being received and stored in condensers 823–1 through 823–6 in channel 1 and the corresponding channel condensers in the other channels. Consequently, it is undesirable to recognize any spurious pulses which may pass through the clipping amplifier 912 at this time. However, during the other third of this cycle no pulses are being received and stored upon condensers 823–1 through 823–6. Consequently, the output of the decoding circuits 913–1 through 913–6 at this time will respond to the previously received permutation code group of pulses and transmit a pulse position modulation pulse to the pulse position modulation system. This pulse will be related to a synchronizing pulse supplied by or under control of multivibrator 422 and thus permit the pulse to be position pulse transmitted to this equipment to be properly interpreted and converted into the speech or other complex wave.

What is claimed is:

1. In a communication system comprising an input circuit responsive to pulses the time relationship of which relative to a reference time conveys information, apparatus for generating from each of said pulses a permutation code group of pulses representing the same information comprising a plurality of continuously operating sources of electrical energy having outputs of different frequencies, apparatus responsive to a received pulse for storing information regarding the phase of the output of each of said sources at the time said pulse is received, and an apparatus controlled by the stored information regarding the phase of the outputs of said sources at said time for generating a series of permutation code pulses.

2. In a communication system, a plurality of continuously operating double stability multivibrator circuits each having a different fundamental frequency, a storage device associated with each of said multivibrators, and an apparatus responsive to a received pulse for storing the condition of stability of the multivibrator circuit in said storage device at the instant of reception of said pulse.

3. In a communication system, a plurality of multivibrator circuits for generating substantially square-shaped waves of electrical power having different fundamental frequencies and different phase relationships, a utilization circuit, apparatus responsive to a received group of permutation code signals for connecting the multivibrator of each fundamental frequency to said utilization circuit, and an apparatus responsive to the character of the permutation code signal for selecting a particular phase of each of said waves of a given frequency for connection to said utilization circuit.

4. In a communication system, a plurality of multivibrator circuits for generating substantially square-shaped waves of electrical power having different fundamental frequencies and phase relationships, a utilization circuit, apparatus responsive to a received group of permutation code signals for connecting a multivibrator of each fundamental frequency of said utilization circuit, apparatus responsive to the character of the permutation code signal for selecting a particular phase of each of said waves of a given frequency for connection to said utilization circuit, and an apparatus included in said utilization circuit solely responsive to the maximum sum of said waves.

5. A communication system for transmitting information comprising an input circuit for receiving pulse position pulses the time relationship of which with respect to a reference time conveys information, a plurality of multivibrator oscillators having alternate conditions of stability, an apparatus for generating a permutation code series of pulses in which there is a pulse for each of said multivibrators, apparatus responsive to each received pulse position pulse for determining the condition of each of said multivibrator circuits at the instant of time the pulse is received, and an apparatus for transmitting the pulse of each permutation code group, the character of which is determined by the condition of stability of the respective multivibrator circuits at the instant each of said pulse position pulses is received.

6. In a communication system, an input circuit for receiving code combinations of a plurality of pulses each of which may comprise any one of a plurality of different signaling conditions, a plurality of multivibrator circuits for securing an output of electrical power having a different fundamental frequency for each of the pulses and having a different phase or each of the possible signaling conditions of each pulse, an apparatus responsive to the signaling condition of each received pulse for selecting the source of electrical power of the proper phase and fundamental frequency, and an apparatus for combining the output from the selected sources for generating a pulse having a time relationship with respect to a reference time which conveys the same information as said permutation code group of pulses.

7. In a communication system, a source of signals of complex wave form, an apparatus for generating a single pulse having a time relationship relative to a reference time representative of the amplitude of said complex wave at a predetermined instant of time, apparatus for generating a permutation code group of pulses each pulse of which comprises any one of a number of different signaling conditions comprising a plurality of sources of electrical waves in which a source of waves of different fundamental period is provided for each of the pulses of the permutation code group of pulses, apparatus for generating each of the pulses of said permutation code group of pulses, and means for determining the signaling condition of each of said pulses controlled by the condition of the respective electrical waves at the time of said single pulse.

8. In a communication system, a source of signals of complex wave form, an apparatus for repeatedly generating a single pulse having a time relationship relative to a reference time representative of the amplitude of said complex wave at different predetermined instants of time, apparatus responsive to each of said single pulses for generating a group of permutation code pulses each pulse of which has one of a plurality of different characteristies and each group of which represents said amplitudes comprising a plurality of sources of electrical waves in which a source of waves of different frequency is provided for each of the pulses of the permutation code groups of pulses, apparatus for generating each of the pulses of said permutation code groups of pulses, means for determining the characteristic of each of said pulses controlled by the condition of the respective electrical waves at the time of occurrence of said single pulse, apparatus for transmitting said permutation code groups of pulses over a transmission medium, receiving apparatus responsive to each of said pulses of each of said permutation code groups of pulses, a plurality of sources of electrical waves having a different fundamental frequency for each of the pulses of said permutation code groups of pulses and having a different phase for each of the possible characteristics of each of the pulses of the permutation code group, apparatus responsive to each of the received pulses for selecting an electrical wave of a predetermined phase dependent upon the characteristic of said pulse, apparatus for combining all of said selected waves and repeatedly generating a single pulse having a time relationship relative to a reference time controlled by each of said groups of permutation codes representative of the amplitudes of said complex wave at said predetermined intervals of time, and apparatus for reconstructing said complex wave from said last-mentioned pulses.

9. In a communication system a pulse distributor comprising an electron discharge tube for each pulse, a first control element to which said pulses are applied, a second control element, a plurality of sources of electrical potential waves of harmonically related frequencies and different phases, a plurality of coupling networks connected between said second control element and said sources including one network for each different frequency of said sources, cross-connections for connecting said coupling networks to different phases of said frequency sources for different of said electron devices.

10. In a communication system a pulse distributor comprising an electron discharge tube for each pulse, a first control element to which said pulses are applied, a second control element, a plurality of sources of electrical potential waves of different frequencies and different phases, a plurality of coupling networks each of which is connected to said second control element and to one of said sources, cross-connections for connecting said coupling networks to different phases of said frequency sources for different of said electron devices, means including terminals individual to each of said networks for readily changing said cross-connections.

11. In a communication system a plurality of channels of communication, apparatus for transmitting a plurality of pulses forming a permutation code group from each channel comprising an electron discharge device for the transmission of each of said pulses, apparatus for normally preventing transmission through all of said electron discharge devices, apparatus for permitting transmission through each of said devices once for each cycle of operation before a second pulse is transmitted through any of said devices, and interconnecting means for causing the transmission of the pulses from the respective channels in a random time manner with respect to all of the other pulses.

12. A multichannel communication system comprising a plurality of sources of complex waves, apparatus for periodically sampling each of said waves and deriving a single pulse from each sample representative thereof, translating equipment for generating a permutation code group of a plurality of pulses each of one of a plurality of different possible characteristics, a multiplex distributor arrangement for transmitting said pulses from the respective channels with a random sequence of the pulses both within the given channel and also between the pulses of the different channels, and receiving equipment comprising a similar multiplex distributor for sorting the received pulses and directing them to their respective channels, other equipment for decoding said pulses and reconstructing the complex waves therefrom.

13. A pulse receiving device comprising apparatus for receiving pulses, a storage device, apparatus for directing said pulses to a storage device individual thereto, apparatus responsive to the storage of a pulse in each of said storage devices for generating a signaling condition of the same character as said pulse, other apparatus for generating a signaling condition of different character from said pulse and means responsive to the most positive of said signaling conditions for controlling an output repeating device.

14. In a communication system an input circuit for receiving code combinations of a plurality of pulses each of which may comprise any one of a plurality of characteristics, a storing device for storing the characteristic of each of the received pulses thereupon, apparatus for deriving signaling conditions under control of said stored pulse corresponding to each of the possible characteristics of said pulse in different control circuits, a plurality of multivibrator circuits for securing electrical wave forms having a different fundamental frequency for each of the pulses of the permutation code groups and having a different phase relative to one another for each of the possible characteristics of the pulses, and apparatus responsive to the most positive of said characteristics for selecting a wave having a predetermined phase dependent upon the characteristic of the respective received pulse, and apparatus for combining the selected waves for generating a pulse having a time relationship with respect to a reference time which conveys the same information as said permutation code group of pulses.

15. A method of decoding permutation code groups of signaling pulses comprising the following steps: (1) receiving and storing the pulses of each code group, (2) combining the stored pulses to form a single pulse of fixed amplitude and duration but related in time to a reference time in accordance with the received code group of pulses, (3) changing the single pulse into a variable amplitude pulse, and (4) combining a plurality of said variable amplitude pulses to form an output signal.

16. In a communication system a pulse distributor comprising an electron discharge tube for each pulse, a first control element to which said pulses are applied, a second control element, a plurality of sources of electrical potential waves of different frequencies and different phases, a plurality of networks connected between said second control element and said sources including different networks for different frequencies of said sources, cross-connections for connecting said coupling networks to different combinations of the phases of said frequency sources for different of said electron devices.

17. In a communication system a pulse distributor comprising an electron discharge tube for each pulse, a first control element to which said pulses are applied, a second control element, a plurality of sources of electrical potential waves of different frequencies each higher frequency of which is twice the next lower frequency and of different phases for each frequency, a plurality of coupling networks including one-way transmission devices connected between said second control element and said sources including one network for each different frequency of said sources, cross-connections for connecting said coupling networks to different phases of said frequency sources for different of said electron devices, means including terminals individual to each of said networks for readily changing said cross-connections.

18. In a communication system a plurality of channels of communication, apparatus for transmitting a plurality of pulses forming a permutation code group from each channel comprising an electron conduction device for the transmission of each of said pulses, bias means for normally preventing transmission through all of said electron discharge devices, a plurality of sources of electrical waves, equipment for applying said waves in a multiple circuit for overcoming said bias of each of said devices at predetermined instants of time, once for each cycle of operation and before any of said bias means is overcome a second time, and interconnecting means for causing said waves to overcome said bias means of the respective electron conduction devices at arbitrary times with respect to the others of said electron discharge devices.

19. A multichannel communication system comprising a plurality of sources of complex waves, apparatus for periodically sampling each of said waves, translating equipment for generating a permutation code group of a plurality of pulses each of which has one of a plurality of different possible characteristics, a multiplex distributor arrangement comprising a plurality of sources of alternating electrical energy having different frequency and different relative phases, means controlled by said source for transmitting said pulses from the respective channels with a random sequence of the pulses both within the given channel and also between the pulses of the different channels, and receiving equipment comprising a similar multiplex distributor comprising a second plurality of sources of alternating electrical energy having frequencies and relative phases corresponding to the frequencies and relative phases of said first plurality of sources, apparatus controlled by said second plurality of sources for sorting the received pulses and directing them to their respective channels, synchronizing means for maintaining the corresponding frequencies of said second plurality of sources in synchronism with the frequencies of said first plurality of sources, other equipment for decoding said pulses and reconstructing the complex waves therefrom.

20. A pulse receiving device comprising apparatus for receiving permutation code groups of pulses each pulse of which may comprise any one of a plurality of different signaling conditions, a plurality of storage devices, apparatus for directing the respective pulses of said code groups of pulses to a storage device individual thereto, a controllable transmission device for each different possible signaling condition of each of the pulses in said groups of pulses, apparatus responsive to the storage of a pulse in each of said storage devices for generating a controlling condition of the same signaling condition as said pulse for controlling one of said controllable transmission devices, other apparatus for generating a controlling condition of a different signaling condition from said pulse for controlling another one of said controllable transmission devices and utilization means connected to said controllable transmission devices.

21. In a communication system an input circuit for receiving code combinations of a plurality of pulses each of which may comprise any one of a plurality of characteristics, a storing device for storing the characteristic of each of the received pulses therein, apparatus for deriving a plurality of potential conditions in accordance with the characteristic of said stored pulse each corresponding to each of the possible characteristics of said pulse in different control circuits, a plurality of multivibrator circuits for securing electrical wave form having a different fundamental frequency for each of the pulses of the permutation code groups and having a different phase relative to one another for each of the possible signaling conditions of the pulses, potential controlled apparatus for selecting each of said waves responsive to the most positive of said potential conditions derived from each pulse for selecting the wave having a predetermined phase dependent upon the characteristic of the respective received pulse, and apparatus for combining the selected waves for generating a pulse having a time relationship with respect to a reference time which conveys the same information as said permutation code group of pulses.

22. In a communication system, a plurality of multivibrator circuits having two conditions of stability and each having a fundamental frequency which is twice the next lower frequency, a storage device associated with each of said multivibrators, and an apparatus responsive to a received pulse for storing the condition of stability of the output of each multivibrator circuit in the associated storage device at the instant of reception of said pulse.

23. In a communication system, a plurality of multivibrator circuits for generating substantially square-shaped waves of electrical power having different fundamental frequencies and different phase relationships, a utilization circuit, an apparatus responsive to a received group of permutation code signals for connecting the multivibrator of each fundamental frequency to said utilization circuit, and an apparatus responsive to the character of the individual pulses of said permutation code signals for selecting a particular phase of each of said waves of a given frequency, and equipment for combining said selected waves.

24. In a communication system, a plurality of multivibrator circuits for generating substantially square-shaped waves of electrical power having different phase relationships and having different frequencies in which each higher frequency is twice the next lower frequency, a utilization circuit, an apparatus responsive to each received pulse of a group of permutation code signals for connecting a multivibrator of a different fundamental frequency to said utilization circuit, an apparatus responsive to the character of the permutation code signal for selecting a particular phase of each of said waves of a given frequency for connection to said utilization circuit, and an apparatus included in said utilization circuit solely responsive to the maximum sum of said waves.

25. In a communication system an input circuit for receiving time position pulses the time relationship which with respect to a reference time conveys the information, a plurality of multivibrator oscillators, an apparatus for generating a permutation code group of pulses in which a pulse is generated under control of each of said multivibrators, storing apparatus responsive to each received time position pulse for storing the phase of each of said multivibrator circuits at the instant of time the pulse is received, and apparatus for transmitting each pulse of each permutation code group under control of the phase of the respective multivibrator circuits at the instant each of said pulses is received.

26. In a communication system, an input circuit for receiving code combinations of a plurality of pulses each of which may comprise any number of a plurality of signaling conditions, a plurality of multivibrator circuits for securing an output of electrical wave forms having different fundamental frequencies in which each higher frequency is twice the next lower frequency and in which each fundamental frequency assigned to each of the pulses and having a different phase for each of the possible signaling conditions of each pulse, an apparatus responsive to the character of each received pulse for selecting the source of electrical power of the proper phase and fundamental frequency, and an apparatus for adding the instantaneous values of the selected wave forms together, apparatus to select the maximum positive value of said sum to form a pulse having a time relationship with respect to a reference time which conveys the same information as said permutation code group of pulses.

27. In a communication system, a source of signals of complex wave form, an apparatus for generating permutation code groups of pulses each group of which comprises $n$ pulses of $m$ different characteristics ($m$ and $n$ being integers), representative of the amplitude of said complex wave at a predetermined time comprising at least $n$ sources of electrical waves in which a source of waves of different frequencies is provided for each of the pulses of the permutation code groups of pulses, an apparatus for generating each of the pulses of said permutation code groups of pulses, means for determining the characteristic of each of said pulses controlled by the respective electrical waves, an apparatus for transmitting said permutation code group of pulses over a transmission medium, a receiving apparatus responsive to each of said pulses of each of said permutation code groups of pulses, $n$ sources of electrical waves having a different fundamental frequency for each of the pulses of said permutation code group of pulses and having $m$ different phases, i.e., one for each of the possible characteristics of each of the pulses of the permutation code group, decoding apparatus responsive to each of the received pulses for selecting electrical waves of a predetermined phase dependent upon the characteristic of said pulse, and an apparatus responsive to said decoding apparatus for reconstructing said complex wave.

28. A system for producing permutation code signals representing the amplitude of a signal wave at recurrent sampling instants comprising means for producing an impulse the time of occurrence of which is proportional to the amplitude of the signal wave at each of said instants, means for continuously generating a series of harmonically related waves, means for comparing each of said impulses for coincidence with each of said waves, and means responsive to each of said comparisons for generating a code element.

29. In a communication system, a plurality of channels of communication, apparatus for transmitting a plurality of pulses forming a permutation code group from each channel comprising an electron conduction device for the transmission of each of said pulses, bias means for normally preventing the flowing of current through all of said electron conduction devices, a plurality of sources of electrical waves, equipment for applying said waves in a multiple circuit for overcoming said bias of each of said devices one at a time at predetermined and different instants, and interconnecting means for permitting the connection of said sources to said electron conduction devices in a random manner for causing said waves to overcome said bias means of the respective electron conduction device at arbitrarily determined predetermined instants of time.

30. In a communication system, a source of signals of complex wave form, apparatus for repeatedly generating a single pulse each having a time relationship relative to a reference time representative of the amplitude of said complex wave at a different instant of time, apparatus for generating a permutation code group of pulses for each of said single pulses in which each of the pulses of said permutation code groups of pulses may have any one of a plurality of distinguishable characteristics, comprising a source of electrical waves for each pulse of said code groups of pulses each having recognizable variations with time and having a different fundamental period, apparatus for generating each of the pulses of said permutation code group of pulses, and means for determining the characteristics of each of said pulses controlled by the condition of the variation of the respective electrical waves at the instants of time of occurrence of said single pulses.

31. In a communication system, a source of signals of complex wave form, an apparatus for generating a single pulse having a time relationship relative to a reference time representative of the amplitude of said complex wave at a predetermined instant of time, apparatus for generating a group of permutation code pulses each pulse of which may comprise any one of a plurality of different distinguishable signals comprising a plurality of sources of electrical waves in which a source of waves of different frequency is provided for each of the pulses of the permutation code groups of pulses, apparatus for generating each of the pulses of said permutation code groups of pulses, means for determining the particular one of said different distinguishable signals for each of said pulses controlled by the condition of the respective electrical wave at the time of occurrence of said single pulse, apparatus for transmitting said permutation code groups of pulses over a transmission medium, receiving apparatus responsive to each of said pulses of said permutation code groups of pulses, a plurality of sources of electrical waves having a different fundamental frequency for each of the pulses of said permutation code groups of pulses and having a different phase for each of the possible distinguishable signals of each of the pulses of the permutation code group, apparatus responsive to each of the received pulses for selecting an electrical wave of a predetermined phase dependent upon the particular distinguishable signal of said pulse, an apparatus for combining all of said selected waves and generating a single pulse having a time relationship relative to a reference time controlled by said groups of permutation codes representative of the amplitudes of said complex wave at said predetermined intervals of time.

References Cited in the file of this patent

UNITED STATES PATENTS

| | | |
|---|---|---|
| Re 21,778 | Potts | Apr. 22, 1941 |
| 1,873,786 | Ranger | Aug. 23, 1932 |
| 2,007,809 | Nicolson | July 9, 1935 |
| 2,272,070 | Reeves | Feb. 3, 1942 |